United States Patent
Yamada et al.

(10) Patent No.: US 6,372,681 B1
(45) Date of Patent: *Apr. 16, 2002

(54) CATALYST FOR OLEFIN POLYMER PRODUCTION AND PROCESS FOR OLEFIN POLYMER PRODUCTION EMPLOYING THE CATALYST

(75) Inventors: Satoru Yamada; Akihiro Yano, both of Mie (JP)

(73) Assignee: Tosoh Corporation, Yamaguchi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,062

(22) Filed: Mar. 9, 1999

(30) Foreign Application Priority Data

Mar. 9, 1998 (JP) ............................................. 10-056585
Jan. 11, 1999 (JP) ............................................. 11-003803

(51) Int. Cl.[7] ................................................. B01J 31/00
(52) U.S. Cl. ........................ 502/117; 502/103; 502/114; 502/152
(58) Field of Search ................................ 502/103, 114, 502/117, 152, 407, 408, 410, 411, 412

(56) References Cited

U.S. PATENT DOCUMENTS 4,148,983 A * 4/1979 Throckmorton ............. 526/139
5,973,084 A * 10/1999 Suga et al. .................. 526/129

FOREIGN PATENT DOCUMENTS

EP    0 658 576 A    6/1995

OTHER PUBLICATIONS

Chemical Abstracts, vol. 123, No. 20, Nov. 13, 1995 Columbus, OH, US: abstract No. 274205, Golub, A.S. et al: "Formation of intercalation compounds of MoS2 with alkali metal and alkylammonium cations from a monolayer dispersion of molybdenum disulfide" XP002133340.

* cited by examiner

*Primary Examiner*—Elizabeth D. Wood
(74) *Attorney, Agent, or Firm*—Sughrue Mion, PLLC

(57) ABSTRACT

A novel catalyst for olefin polymerization is provided which comprises [A] a metallocene compound containing a transition metal selected from Groups 3, 4, 5, and 6 of Periodic Table, [B] a reaction product of topotactic reduction by electron transfer, and [C] an organoaluminum compound. The catalyst may contain additionally [D] an organoalkaline earth metal compound or an organozinc compound. This catalyst has high catalytic activity for olefin polymerization without employing an expensive catalyst component.

8 Claims, No Drawings

CATALYST FOR OLEFIN POLYMER PRODUCTION AND PROCESS FOR OLEFIN POLYMER PRODUCTION EMPLOYING THE CATALYST

BACKGROUND OF THE INVENTION

1. Field of the Invention

The present invention relates to a catalyst for olefin polymer production comprising a metallocene compound, a reaction product of topotactic reduction by electron transfer, and an organoaluminum compound, and a process for producing an olefin polymer employing the catalyst.

The present invention relates also to a catalyst for olefin polymer production comprising a metallocene compound, a product of a topotactic reduction reaction by electron transfer, an organoaluminum compound, an organoalkaline earth metal compound or an organozinc compound, and a process for producing an olefin polymer employing the catalyst.

2. Description of the Related Art

A catalyst composed of a metallocene compound and an organoaluminum compound, and another catalyst composed of a metallocene compound, an organoaluminum compound, and an organomagnesium compound are disclosed as the catalyst for producing an olefin polymer (JP-A-3-197513, and JP-A-3-290408). However, these catalysts are not satisfactory in the catalyst activity.

Active catalysts for olefin polymer production are disclosed which are composed of a metallocene compound and a methylaluminoxane (JP-A-58-19309, and JP-A-60-35007). These catalyst employs a large amount of expensive aluminoxane to produce a polymer having industrially useful properties, which causes problems of high catalyst cost and residual aluminum.

Highly active olefin polymerization catalysts not containing the methylaluminoxane are disclosed which comprises a metallocene compound, a boron compound, and an organoaluminum compound (Kohyo 1-501950, and Kohyo 1-502036). However, the boron compound for this catalyst is disadvantageously complicated and expensive.

SUMMARY OF THE INVENTION

The present invention intends to solve the above technical problems, and to provide a catalyst for olefin polymer production with high catalyst activity without using an expensive catalyst component. The present invention also provides a process for producing an olefin polymer with the catalyst.

The olefin polymerization catalyst of the present invention comprises [A] a metallocene compound containing a transition metal selected from Groups 3, 4, 5, and 6 of Periodic Table, [B] a reaction product of topotactic reduction with electron transfer, and [C] an organoaluminum compound.

The olefin polymerization catalyst of another embodiment of the present invention comprises [A] a metallocene compound containing a transition metal selected from Groups 3, 4, 5, and 6 of Periodic Table, [B] a reaction product of topotactic reduction by electron transfer, [C] an organoaluminum compound, and [D] an organoalkaline earth metal compound or an organozinc compound.

The process for producing an olefin polymer of the present invention uses the above catalyst.

DETAILED DESCRIPTION OF THE PREFERRED EMBODIMENT

The topotactic reduction with electron transfer in the present invention is a reaction, as defined by R. Schöllhorn: Angew. Chem. Int. Ed. Eng., 19, 983–1003 (1980), in which a host compound is reduced by electrons and guest are introduced into vacant lattice sites of the host compound to balance the electric charges without change of the structure and composition of the host compound by the reaction. This reaction is represented by General Formula (35) below:

$$xE^+ + xe^- + \square[Q] \rightarrow (E^+)_x[Q]^{x-} \quad (35)$$

where [Q] is the host compound, $\square$ is a vacant lattice site of [Q], $e^-$ is an electron, x is a number of reduction, and $E^+$ is a monovalent guest cation.

The component [B] in the present invention is a reaction product of the above electron-transferring topotactic reduction, and is represented by General Formula (36):

$$E^{n+}{}_{(k/n)}(L^2)_h[Q]^{k-} \quad (36)$$

where [Q] is a host compound, k is a number of reduction, $E^{n+}$ is an n-valent guest cation, $L^2$ is a Lewis base, and h is a number of the Lewis base.

The host compound [Q] includes host compounds of three-dimensional structure, host compounds of two-dimensional structure, host compounds of one-dimensional structure, and host compounds of a molecular solid.

The host compounds of three-dimensional structure include hexamolybdenum octasulfide, hexamolybdenum octaselenide, trimolybdenum tetrasulfide, trititanium tetrasulfide, hexatitanium octaselenide, triniobium tetrasulfide, hexavanadium octasulfide, pentavanadium octasulfide, divanadium pentaoxide, tungsten trioxide, titanium dioxide, vanadium dioxide, chromium dioxide, manganese dioxide, tungsten dioxide, ruthenium dioxide, osmium dioxide, and iridium dioxide.

The host compounds of two-dimensional structure include titanium disulfide, zirconium disulfide, hafnium disulfide, vanadium disulfide, niobium disulfide, tantalum disulfide, chromium disulfide, molybdenum disulfide, tungsten disulfide, rhenium disulfide, platinum disulfide, tin disulfide, lead disulfide, titanium diselenide, zirconium diselenide, hafnium diselenide, vanadium diselenide, niobium diselenide, tantalum diselenide, chromium diselenide, molybdenum diselenide, tungsten diselenide, rhenium diselenide, platinum diselenide, tin diselenide, lead diselenide, titanium ditelluride, zirconium ditelluride, hafnium ditelluride, vanadium ditelluride, niobium ditelluride, tantalum ditelluride, chromium ditelluride, molybdenum ditelluride, tungsten ditelluride, rhenium ditelluride, platinum ditelluride, tin ditelluride, lead ditelluride, magnesium phosphorus trisulfide, calcium phosphorus trisulfide, vanadium phosphorus trisulfide, manganese phosphorus trisulfide, iron phosphorus trisulfide, cobalt phosphorus trisulfide, nickel phosphorus trisulfide, palladium phosphorus trisulfide, zinc phosphorus trisulfide, cadmium phosphorus trisulfide, mercury phosphorus trisulfide, tin phosphorus trisulfide, magnesium phosphorus triselenide, calcium phosphorus triselenide, vanadium phosphorus triselenide, manganese phosphorus triselenide, iron phosphorus triselenide, cobalt phosphorus triselenide, nickel phosphorus triselenide, palladium phosphorus triselenide, zinc phosphorus triselenide, cadmium phosphorus triselenide, mercury phosphorus triselenide, tin phosphorus triselenide, chromium phosphorus tetrasulfide, tantalum sulfide carbide, molybdenum trioxide, octadecamolybdenum dopentacontaoxide (18-molubdenum 52-oxide), divanadium pentaoxide gel, iron oxychloride, titanium oxychloride, vanadium oxychloride, chromium oxychloride, aluminum oxychloride, bismuth oxychloride, α-zirconium nitride chloride, β-zirconium nitride chloride, α-zirconium nitride bromide, β-zirconium nitride bromide, zirconium nitride iodide, titanium nitride chloride, titanium nitride bromide, titanium nitride iodide, graphite, and polyacene.

The host compounds of one-dimensional structure include titanium trisulfide, niobium triselenide, potassium iron disulfide, polyacetylene, polyaniline, polypyrrole, polythiophene, poly(p-phenylene), poly(triphenylene), polyazulene, polyfluorene, polynaphthalene, polyanthracene, polyfuran, polycarbazole, tetrathiafluvalene-substituted polystyrene, ferrocene-substituted polyethylene, carbazole-substituted polyethylene, and polyoxyphenazine.

The host compounds of a molecular solid include tetracyanoquinodimethane, and tetrathiafluvalene.

The host compound [Q] may be a mixture of two or more of the above host compounds.

The number of reduction, k, is preferably in the range of $0<k\leq 3$, more preferably $0<k\leq 2$ for high catalytic activity for olefin polymerization, but is not especially limited thereto.

The Lewis base or a cyclopentadienyl group, $L^2$, may be one capable of coordinating with $E^{n+}$. The Lewis base includes water, amine compounds, nitrogen-containing heterocyclic compounds; ethers such as ethyl ether and n-butyl ether; amides such as formamide, N-methylformamide, N,N-dimethylformamide, and N-methylacetamide; alcohols such as methyl alcohol, and ethyl alcohol; diols such as 1,2-butanediol, 1,3-butanediol, 1,4-butanediol, and 2,3-butanediol; glycerin, polyethylene glycol, diglyme, 1,2-dimethoxyethane, trimethyl phosphate, hexamethylphosphoramide, tri-n-butylphosphine oxide, 1,4-dioxane, acetonitrile, tetrahydrofuran, dimethyl sulfoxide, and propylene carbonate. The Lewis base, $L^2$, may be a mixture of two or more of the above compounds.

The number of the Lewis base, h, is preferably in the range of $0\leq h\leq 10$.

The n-valent guest cation, $E^{n+}$, may be a cation containing at least one atom selected from the group of atoms of Groups 1 to 14 of Periodic Table. The valency, n, of the guest cation is in the range of $0<n\leq 10$. For higher catalytic activity for olefin polymerization, the $E^{n+}$ is at least one cation selected from the group of cations represented by General Formulas (37), (38), (39), and (40):

$$R^{21}{}_2R^{22}NH^+ \qquad (37)$$

where $R^{21}{}_2R^{22}N$ is an amine: $R^{21}$ being independently a hydrogen atom, or an aliphatic hydrocarbon group of 1 to 30 carbons, $R^{22}$ being independently a hydrogen atom, an aliphatic hydrocarbon group of 1 to 30 carbons, or an aromatic hydrocarbon group of 1 to 50 carbons,

$$T^1H^+ \qquad (38)$$

where $T^1$ is a nitrogen-containing heterocyclic compound,

$$(R^{23})^+ \qquad (39)$$

where $(R^{23})^+$ is a carbonium cation of 1 to 50 carbons, or a tropylium cation, and

$$G^{n+} \qquad (40)$$

where G is an atom selected form atoms of Groups 1 to 14 of Periodic Table , and $G^{n+}$ is an n-valent cation.

The amine, $R^{21}{}_2R^{22}N$, includes aliphatic amines such as methylamine, ethylamine, n-propylamine, isopropylamine, n-butylamine, isobutylamine, t-butylamine, allylamine, cyclopentylamine, dimethylamine, diethylamine, diallylamine, trimethylamine, tri-n-butylamine, triallylamine, hexylamine, 2-aminoheptane, 3-aminoheptane, n-heptylamine, 1,5-dimethylhexylamine, 1-methylheptylamine, n-octylamine, t-octylamine, nonylamine, decylamine, undecylamine, dodecylamine, tridecylamine, tetradecylamine, pentadecylamine, hexadecylamine, heptadecylamine, octadecylamine, nonadecylamine, cyclohexylamine, cycloheptylamine, cyclohexylmethylamine, 2-methylcyclohexylamine, 4-methylcyclohexylamine, 2,3-dimethylcyclohexylamine, cyclododecylamine, 2-(1-cyclohexenyl)ethylamine, geranylamine, N-methylhexylamine, dihexylamine, bis(2-ethylhexyl)amine, dioctylamine, didecylamine, N-methylcyclohexylamine, N-ethylcyclohexylamine, N-isopropylcyclohexylamine, N-t-butylcyclohexylamine, N-allylcyclohexylamine, N,N-dimethyloctylamine, N,N-dimethylundecylamine, N,N-dimethyldodecylamine, N,N-dimethyloctadecylamine, N,N-dioctadecylmethylamine, N,N-dioleoylmethylamine, trihexylamine, triisooctylamine, trioctylamine, triisodecylamine, tridodecylamine, N,N-dimethylcyclohexylamine, and N,N-diethylcyclohexylamine; and aromatic amines such as aniline, N-methylaniline, N-ethylaniline, N-allylaniline, o-toluidine, m-toluidine, p-toluidine, N,N-dimethylaniline, N-methyl-o-toluidine, N-methyl-m-toluidine, N-methyl-p-toluidine, N-ethyl-o-toluidine, N-ethyl-m-toluidine, N-ethyl-p-toluidine, N-allyl-o-toluidine, N-allyl-m-toluidine, N-allyl-p-toluidine, N-propyl-o-toluidine, N-propyl-m-toluidine, N-propyl-p-toluidine, 2,3-dimethylaniline, 2,4-dimethylaniline, 2,5-dimethylaniline, 2,6-dimethylaniline, 3,4-dimethylaniline, 3,5-dimethylaniline, 2-ethylaniline, 3-ethylaniline, 4-ethylaniline, N,N-diethylaniline, 2-isopropylaniline, 4-isopropylaniline, 2-t-butylaniline, 4-n-butylaniline, 4-s-butylaniline, 4-t-butylaniline, 2,6-diethylaniline, 2-isopropyl-6-methylaniline, 2-chloroaniline, 3-chloroaniline, 4-chloroaniline, 2-bromoaniline, 3-bromoaniline, 4-bromoaniline, o-anisidine, m-anisidine, p-anisidine, o-phenetidine, m-phenetidine, p,-phenetidine, 1-aminonaphthalene, 2-aminonaphthalene, 1-aminofluorene, 2-aminofluorene, 3-aminofluorene, 4-aminofluorene, 5-aminoindene, 2-aminobiphenyl, 4-aminobiphenyl, N,2,3-trimethylaniline, N,2,4-trimethylaniline, N,2,5-trimethylaniline, N,2,6-trimethylaniline, N,3,4-trimethylaniline, N,3,5-trimethylaniline, N-methyl-2-ethylaniline, N-methyl-3-ethylaniline, N-methyl-4-ethylaniline, N-methyl-6-ethyl-o-toluidine, N-methyl-2-isopropylaniline, N-methyl-4-isopropylaniline, N-methyl-2-t-butylaniline, N-methyl-4-n-butylaniline, N-methyl-4-s-butylaniline, N-methyl-4-t-butylaniline, N-methyl-2,6-diethylaniline, N-methyl-2-isopropyl-6-methylaniline, N-methyl-p-anisidine, N-ethyl-2,3-anisidine, N,N-dimethyl-o-toluidine, N,N-dimethyl-m-toluidine, N,N-dimethyl-p-toluidine, N,N,2,3-tetramethylaniline, N,N,2,4-tetramethylaniline, N,N,2,5-tetramethylaniline, N,N,2,6-tetramethylaniline, N,N,3,4-tetramethylaniline, N,N,3,5-tetramethylaniline, N,N-dimethyl-2-ethylaniline, N,N-dimethyl-3-ethylaniline, N,N-dimethyl-4-ethylaniline, N,N-dimethyl-6-ethyl-o-toluidine, N,N-dimethyl-2-isopropylaniline, N,N-dimethyl-4-isopropylaniline, N,N-dimethyl-2-t-butylaniline, N,N-dimethyl-4-n-butylaniline, N,N-dimethyl-4-s-butylaniline, N,N-dimethyl-4-t-butylaniline, N,N-dimethyl-2,6-diethylaniline, N,N-dimethyl-2-isopropyl-6-methylaniline, N,N-dimethyl-2-chloroaniline, N,N-dimethyl-3-chloroaniline, N,N-dimethyl-4-chloroaniline, N,N- dimethyl-2-bromoaniline, N,N-dimethyl-3-bromoaniline, N,N-dimethyl-4-bromoaniline, N,N-dimethyl-o-anisidine, N,N-dimethyl-m-anisidine, N,N-dimethyl-p-anisidine, N,N-dimethyl-o-phenetidine, N,N-dimethyl-m-phenetidine, N,N-dimethyl-p-phenetidine, N,N-dimethyl-1-aminonaphthalene, N,N-dimethyl-2-aminonaphthalene, N,N-dimethyl-1-aminofluorene, N,N-dimethyl-2-aminofluorene, N,N-dimethyl-3-aminofluorene, N,N-dimethyl-4-aminofluorene, N,N-dimethyl-5-aminoindene, N,N-dimethyl-2-aminobiphenyl, N,N-dimethyl-4-aminobiphenyl, and N,N-dimethyl-p-trimethylsilylaniline.

The nitrogen-containing heterocyclic compound, $T^1$, includes pyrrole, oxazole, isoxazole, thiazole, isothiazole, imidazole, pyrazole, furazan, pyridine, pyridazine, pyrimidine, pyrazine, pyrroline, pyrrolidine, imidazoline, imidazolidine, pyrazoline, pyrazolidine, piperidine, piperazine, morpholine, picoline, collidine, indole, isoindole, indazole, quinoline, isoquinoline, cinnoline, quinazoline, quinoxaline, phthalazine, purine, pteridine, carbazole, phenanthridine, acridine, phenazine, phenanthroline, indoline, isoindoline, 2,5-dimethylpyrrolidine, 2-methylpiperidine, 3-methylpiperidine, 4-methylpiperidine, 2,6-dimethylpiperidine, 3,3-dimethylpiperidine, 3,5-dimethylpiperidine, 2-ethylpiperidine, 2,2,6,6-tetremethylpiperidine, 1-methylpyrrolidine, 1-methylpiperidine, 1-ethylpiperidine, 1-butylpyrrolidine, and 1,2,2,6,6-pentamethylpiperidine.

The cation represented by General Formula (39) includes triphenylmethyl cation, and tropylium cation.

The cation represented by General Formula (40) includes cations of atoms of hydrogen, lithium, sodium, potassium, rubidium, cesium, berylium, magnesium, calcium, strontium, barium, titanium, zirconium, hafnium, niobium, tantalum, chromium, iron, nickel, copper, silver, zinc, aluminum, and tin.

The method of preparation of Component [B] is not especially limited. The examples of the method are shown below.

(a) A host compound is immersed into a solution of guest cation-forming atoms in liquid ammonia (41):

$$(k/n)G + [Q] \xrightarrow{NH_3} \quad (41)$$

$$[(k/n)G^{n+} + ke^-(NH_3) + [Q]] \rightarrow G^{n+}_{(k/n)}(NH_3)_h[Q]^{k-}$$

(b) A host compound is allowed to react with guest cation-forming atoms at a temperature from 100 to 1500° C. (42):

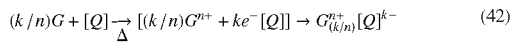

(c) A host compound is allowed to react with a halide of guest cations at a temperature from 100 to 1500° C. (43):

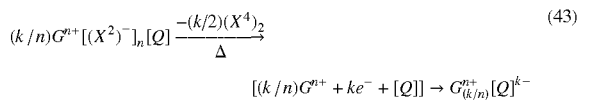

where $X_4$ is a halogen atom.

(d) A host compound is immersed into a nonaqueous solution of a reducing agent (44):

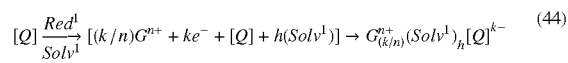

where $Red^1$ is a reducing reagent containing $G^{n+}$, and $Solv^1$ is a nonaqueous solvent.

(e) A host compound is immersed into an aqueous solution of a reducing reagent (45):

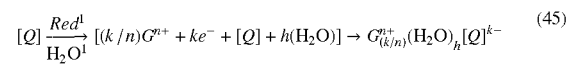

where $Red^2$ is a reducing reagent containing $G^{n+}$, (f) A host compound as a cathode is electrochemically reduced in an electrolyte solution containing guest cations (46):

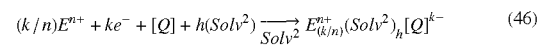

where $Solv^2$ is water or a nonaqueous solvent, (g) A host compound as a cathode is electrochemically reduced with an anode containing guest cations, (46), (h) A host compound as a cathode is electrochemically reduced with an anode containing guest cation-giving atoms, (47):

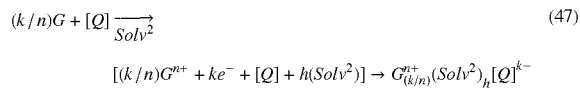

(i) A host compound is allowed to react with an amine at a temperature from 100 to 1500° C., (48):

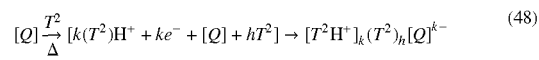

where $T^2$ is an amine, (j) A host compound is allowed to react with a nitrogen-containing heterocyclic compound at a temperature from 100 to 1500° C., (49):

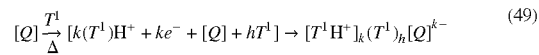

The nonaqueous solvent used in Methods (d), (f), (g), and (h) includes aliphatic hydrocarbons such as butane, pentane, hexane, heptane, octane, nonane, decane, cyclopentane, and cyclohexane; aromatic hydrocarbons such as benzene, toluene, and xylene; ethers such as ethyl ether, and n-butyl ether; halogenated hydrocarbons such as methylene chloride, and chloroform; amides such as formamide, N-methylformamide, N,N-dimethylformamide, and N-methylacetamide; alcohols such as methyl alcohol, and ethyl alcohol; diols such as 1,2-butanediol, 1,3-butanediol, 1,4-butanediol, and 2,3-butanediol; glycerin, polyethylene glycol, diglyme, 1,2-dimethoxyethane, trimethyl phosphate, hexamethylphosphoramide, tri-n-butylphosphine oxide, 1,4-dioxane, acetonitrile, tetrahydrofuran, dimethylsulfoxide, and propylene carbonate.

In Method (c), the halide of the guest cation includes lithium chloride, sodium chloride, potassium chloride, rubidium chloride, and cesium chloride.

In Method (d), the reducing reagent includes n-butyllithium, naphthalenelithium, bezophenonelithium, benzophenonesodium, and lithium iodide. The reducing agent is used at a concentration ranging from 0.001 to 10 mol/L, in an amount ranging from 0.001 to 10 mol per mol of the host compound. The reaction temperature ranges from −100 to 100° C., but is not limited thereto. The reaction time ranges from one minute to 60 days, but is not limited thereto.

In Method (e), the reducing reagent includes sodium dithionite, sodium boron hydride, and sodium sulfide. The reducing reagent is used at a concentration ranging from 0.001 to 10 mol/L, in an amount ranging from 0.001 to 10 mol per mol of the host compound. The reaction temperature ranges from 0 to 100° C., but is not limited thereto. The reaction time ranges from one minute to 60 days, but is not limited thereto.

In Method (f), the electrolyte includes salts of the guest cation: chloride, phosphate, sulfate, nitrate, carbonate, perchlorate, formate, acetate, propionate, oxalate, malonate, succinate, citrate, tetrafluoroborate, and hexafluorophosphate. The electrolyte may be used at a concentration ranging from 0.001 to 10 mol/L.

In Method (g), the anode material is not specially limited, and is exemplified by alkali metal salts of graphite.

In Method (h), the anode material is not specially limited, and is exemplified by lithium.

In Method (i), the amine compound is exemplified by ammonia, and the amines represented by $R^{21}_2R^{22}N$.

Component [B] may be treated before use with a salt, an acid, and/or a Lewis base.

The salt for the salt treatment is a compound constituted of a cation containing at least one atom selected from atoms of Groups 1 to 14 of Periodic Table, and at least one anion selected from halogen anions, inorganic acid anions, and organic acid anions. The cation constituting the salt is preferably at least one cation selected from the group of cations represented by General Formulas (37), (38), (39), and (40). The anion constituting the salt is preferably at least one anion selected from the group of anions of fluorine, chlorine, bromine, iodine, phosphate, sulfate, nitrate, carbonate, perchlorate, formate, acetate, propionate, oxalate, malonate, succinate, citrate, acetylacetonate, tetrafluoroborate, and hexafluorophosphate.

The salt constituted of a cation represented by General Formula (37) and a chloride anion is exemplified by hydrochlorides of the amines represented by the aforementioned formula, $R^{21}_2R^{22}N$.

The salt constituted of a cation represented by General Formula (38) and a chloride anion is exemplified by hydrochlorides of the nitrogen-containing heterocyclic compounds represented by the aforementioned formula, $T_1$.

The salt constituted of a cation represented by General Formula (39) and a halogen anion is exemplified by triphenylmethyl chloride, and tropylium bromide.

The salt containing the cation represented by General Formula (40) includes lithium chloride, sodium chloride, sodium phosphate, sodium sulfate, sodium nitrate, sodium formate, sodium acetete, sodium oxalate, sodium citrate, potassium chloride, rubidium chloride, cesium chloride, beryllium chloride, magnesium chloride, magnesium phosphate, magnesium sulfate, magnesium nitrate, magnesium perchlorate, magnesium acetate, magnesium oxalate, magnesium succinate, calcium chloride, strontium chloride, barium chloride, titanium chloride, zirconium chloride, hafnium chloride, niobium chloride, tantalum chloride, chromium chloride, iron chloride, nickel chloride, copper chloride, silver chloride, silver bromide, zinc chloride, aluminum chloride, aluminum phosphate, aluminum sulfate, aluminum nitrate, aluminum oxalate, tin chloride, and ferrocenium sulfate.

The acid used for the acid treatment includes hydrochloric acid, phosphoric acid, sulfuric acid, nitric acid, carbonic acid, perchloric acid, formic acid, acetic acid, propionic acid, oxalic acid, malonic acid, succinic acid, and citric acid, and mixtures of two or more thereof.

The Lewis base used for the Lewis base treatment includes water, ammonia, the aforementioned amines represented by $R^{21}_2R^{22}N$; the aforementioned nitrogen-containing heterocyclic compound represented by $T_1$; ethers such as ethyl ether, and n-butyl ether; amides such as formamide, N-methylformamide, N,N-dimethylformamide, and N-methylacetamide; alcohols such as methyl alcohol, and ethyl alcohol; diols such as 1,2-butanediol, 1,3-butanediol, 1,4-butanediol, and 2,3-butanediol; glycerin, polyethylene glycol, diglyme, 1,2-dimethoxyethane, trimethyl phosphate, hexamethylphosphoramide, tri-n-butylphosphine oxide, 1,4-dioxane, acetonitrile, tetrahydrofuran, dimethylsulfoxide, and propylene carbonate; and mixtures of two or more thereof.

The salt treatment, acid treatment, and/or Lewis base treatment can be conducted, for example, by immersing at least one reduction product selected from the products of reduction reaction of Methods (a) to (j) into a salt, an acid, and/or a Lewis base, or a solution of a salt, an acid, and/or a Lewis base.

In the case where the salt treatment, the acid treatment, and/or the Lewis base treatment are combined, the treatments may be conducted in various manners: successive treatment with a salt and an acid, with a salt and a Lewis base, with an acid and a salt, with an acid and a Lewis base, with a Lewis base and a salt, or with Lewis base and an acid; simultaneous treatment with a salt and an acid, with a salt and a Lewis acid, or with an acid and a Lewis base; salt treatment and following simultaneous treatment with an acid and a Lewis base, acid treatment and following simultaneous treatment with salt and a Lewis base, Lewis base treatment and following simultaneous treatment with a salt and an acid; simultaneous treatment with a salt and an acid and following Lewis base treatment, simultaneous treatment with a salt and a Lewis base and following acid treatment, simultaneous treatment with an acid and a Lewis base and following salt treatment; or simultaneous treatment with a salt, an acid, and a Lewis base.

The conditions for the treatment with a salt, an acid, or a Lewis base are not specially limited. Preferably, the salt, the acid, or the Lewis base is used at a concentration ranging from 0.001 to 10 mol/L, at a ratio of 0.001 to 10 moles per mole of the guest cation in the reduction product. The treatment temperature ranges preferably from −100 to 150° C. Treatment time ranges preferably from one minute to 60 days.

The solvent for the treatment with a salt, an acid, or a Lewis base includes aliphatic hydrocarbons such as butane, pentane, hexane, heptane, octane, nonane, decane, cyclopentane, and cyclohexane; aromatic hydrocarbons such as benzene, toluene, and xylene; alcohols such as methyl alcohol, and ethyl alcohol; ethers such as ethyl ether, and n-butyl ether; halogenated hydrocarbons such as methylene chloride, and chloroform; 1,4-dioxane, acetonitrile, tetrahydrofuran, dimethylsulfoxide, propylene carbonate, water, and aqueous ammonia; and mixtures of two or more of the above. solvents.

Component [A] in the present invention includes metallocenes containing a transition metal atom such as scandium, yttrium, lanthanum, samarium, titanium, zirconium, hafnium, vanadium, niobium, chromium, and molybdenum. Of these, a metallocene compound is preferred which contains titanium, zirconium, or hafnium.

Specifically, Component [A] is a metallocene represented by General Formula (1):

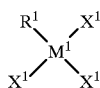
(1)

where $M^1$ is an atom of titanium, zirconium, or hafnium; each $X^1$ is independently a hydrogen atom, a halogen atom, or a hydrocarbon group of 1 to 20 carbons; and $R^1$, which is a ligand of $M_1$, represented by General Formula (2), (3), (4), or (5):

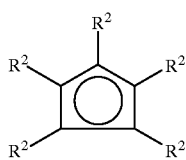
(2)

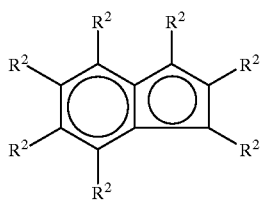
(3)

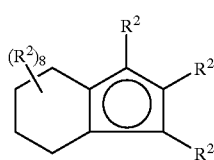
(4)

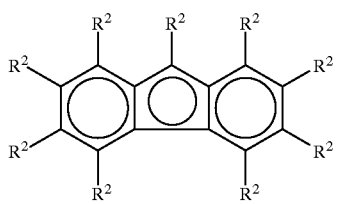
(5)

(wherein each $R^2$ is independently a hydrogen atom, a halogen atom, a hydrocarbon group of 1 to 20 carbons, an amino group-containing hydrocarbon group of 1 to 20 carbons, or oxygen-containing hydrocarbon group of 1 to 20 carbons); or a metallocene represented by General Formula (6) or (7):

(6)

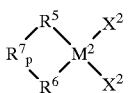
(7)

where $M^2$ is an atom of titanium, zirconium, or hafnium; each $X^2$ is independently a hydrogen atom, a halogen atom, or a hydrocarbon group of 1 to 20 carbons; and $R^3$ and $R^4$ are independently a ligand of $M_2$ and represented by General Formula (8), (9), (10), or (11):

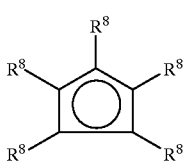
(8)

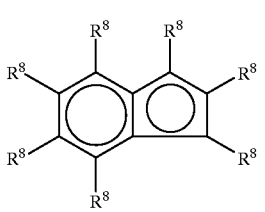
(9)

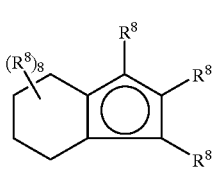
(10)

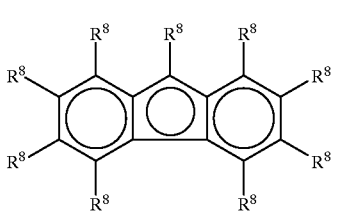
(11)

(wherein each $R^8$ is independently a hydrogen atom, a halogen atom, a hydrocarbon group of 1 to 20 carbons, an amino group-containing hydrocarbon group of 1 to 20 carbons, or oxygen-containing hydrocarbon group of 1 to 20 carbons), the ligands forming a sandwich structure together with $M^2$; $R^5$ and $R^6$ are independently a ligand of $M_2$ and represented by General Formula (12), (13), (14), or (15):

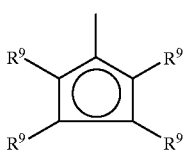
(12)

-continued (13)

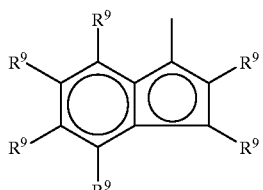

(14)

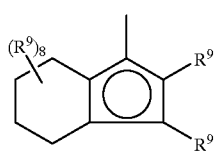

(15)

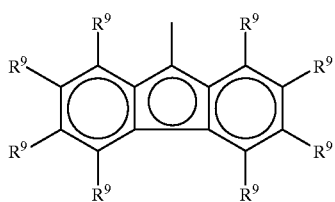

(wherein each $R^9$ is independently a hydrogen atom, a halogen atom, a hydrocarbon group of 1 to 20 carbons, an amino group-containing hydrocarbon group of 1 to 20 carbons, or oxygen-containing hydrocarbon group of 1 to 20 carbons), the ligands forming a sandwich structure together with $M^2$; $R^7$ is represented by General Formula (16) or (17):

(16)

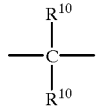

(17)

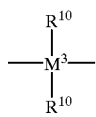

(wherein each $R^{10}$ is independently a hydrogen atom, or a hydrocarbon group of 1 to 20 carbons; $M^3$ is an atom of silicon, germanium, or tin), $R^7$ forming a bridge between $R^5$ and $R^6$, and p is an integer from 1 to 5; or a metallocene represented by General Formula (18), (19), (20), or (21):

(18)

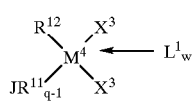

(19)

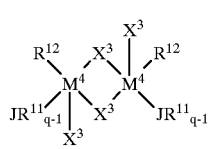

-continued (20)

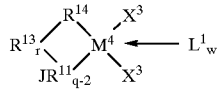

(21)

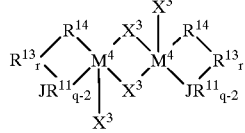

where $M^4$ is an atom of titanium, zirconium, or hafnium; each of $X^3$ is independently a hydrogen atom, a halogen atom, or a hydrocarbon group of 1 to 20 carbons; $L^1$ is a Lewis base, w is a number in the range of $0 \leq w \leq 3$; $JR^{11}_{q-1}$ and $JR^{11}_{q2}$ are independently a heteroatom ligand of $M^4$; J is an element of Group 15 of Periodic Table of coordination number 3 or an element of Group 16 of Periodic Table of coordination number 2; each $R^{11}$ is independently a hydrogen atom, a halogen atom, or a hydrocarbon group of 1 to 20 carbons; q is a coordination number of the element J; $R^{12}$ is a ligand of M and represented by General Formula (22), (23), (24), or (25):

(22)

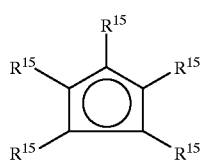

(23)

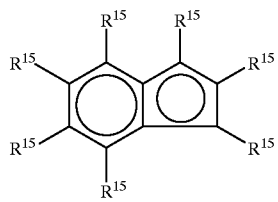

(24)

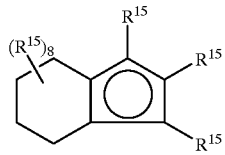

(25)

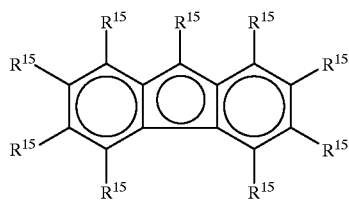

(wherein each $R^{15}$ is independently a hydrogen atom, a halogen atom, a hydrocarbon group of 1 to 20 carbons, an amino group-containing hydrocarbon group of 1 to 20 carbons, or oxygen-containing hydrocarbon group of 1 to 20 carbons), each $R^{14}$ is independently a ligand of $M^4$ and represented by General Formula (26), (27), (28), or (29):

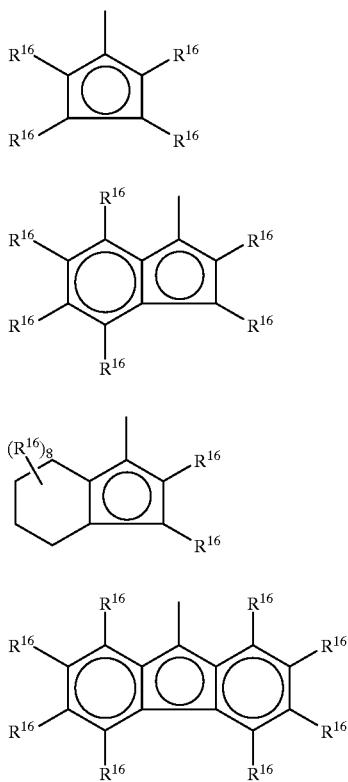

(wherein each of $R^{16}$ is independently a hydrogen atom, a halogen atom, a hydrocarbon group of 1 to 20 carbons, an amino group-containing hydrocarbon group of 1 to 20 carbons, or oxygen-containing hydrocarbon group of 1 to 20 carbons); $R^{13}$ is represented by General Formula (30) or (31):

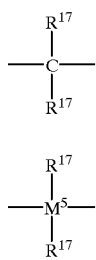

(wherein each $R^{17}$ is independently a hydrogen atom, or a hydrocarbon group of 1 to 20 carbons; $M^5$ is an atom of silicon, germanium, or tin), $R^{13}$ forming a bridge between $R^{14}$ and $JR^{11}_{q-2}$; and r is an integer of 1 to 5. Two of more of the metallocenes can be used combinedly.

The metallocene represented by General Formula (1) includes trichlorides of zirconium such as
(cyclopentadienyl)zirconium trichloride,
(methylcyclopentadienyl)zirconium trichloride,
(1,2-dimethylcyclopentadienyl)zirconium trichloride,
(1,3-dimethylcyclopentadienyl)zirconium trichloride,
(1,2,3-trimethylcyclopentadienyl)zirconium trichloride,
(1,2,4-trimethylcyclopentadienyl)zirconium trichloride,
(tetramethycyclopentadienyl)zirconium trichloride,
(pentamethylcyclopentadienyl)zirconium trichloride,
(n-propylcyclopentadienyl)zirconium trichloride,
(1,2-di-n-propylcyclopentadienyl)zirconium trichloride,
(1,3-di-n-propylcyclopentadienyl)zirconium trichloride,
(isopropylcyclopentadienyl)zirconium trichloride,
(n-butylcyclopentadienyl)zirconium trichloride,
(1,2-di-n-butylcyclopentadienyl)zirconium trichloride,
(1,3-di-n-butylcyclopentadienyl)zirconium trichloride,
(isobutylcyclopentadienyl)zirconium trichloride,
(t-butylcyclopentadienyl)zirconium trichloride,
(indenyl)zirconium trichloride,
(tetrahydroindenyl)zirconium trichloride,
(fluorenyl)zirconium trichloride, and
(octahydrofluorenyl)zirconium trichloride; and trimethyl derivatives, triethyl derivatives, trihydro derivatives, triphenyl derivatives, and tribenzyl derivatives of the above zirconium compounds. Further, compounds derived by replacing the zirconium atom of the above zirconium compound by a titanium atom or a hafnium atom are also useful therefor. The above compounds may be used in combination of two or more thereof.

The metallocene represented by General Formula (6) or (7) includes dichlorides of zirconium such as
bis(cyclopentadienyl)zirconium dichloride,
bis(methylcyclopentadienyl)zirconium dichloride,
bis(1,2-dimethylcyclopentadienyl)zirconium dichloride,
bis(1,3-dimethylcyclopentadienyl)zirconium dichloride,
bis(1,2,3-trimethylcyclopentadienyl)zirconium dichloride,
bis(1,2,4-trimethylcyclopentadienyl)zirconium dichloride,
bis(tetramethycyclopentadienyl)zirconium dichloride,
bis(pentamethylcyclopentadienyl)zirconium dichloride,
bis(n-propylcyclopentadienyl)zirconium dichloride,
bis (1,2-di-n-propylcyclopentadienyl)zirconium dichloride,
bis(1,3-di-n-propylcyclopentadienyl)zirconium dichloride,
bis(isopropylcyclopentadienyl)zirconium dichloride,
bis(n-butylcyclopentadienyl)zirconium dichloride,
bis(1,2-di-n-butylcyclopentadienyl)zirconium dichloride,
bis(1,3-di-n-butylcyclopentadienyl)zirconium dichloride,
bis(isobutylcyclopentadienyl)zirconium dichloride,
bis(t-butylcyclopentadienyl)zirconium dichloride,
bis(indenyl)zirconium dichloride,
bis(tetrahydroindehyl)zirconium dichloride,
bis(fluorenyl)zirconium dichloride,
bis(octahydrofluorenyl)zirconium dichloride,
(cyclopentadienyl)(indenyl)zirconium dichloride,
(cyclopentadienyl)(fluorenyl)zirconium dichloride,
(fluorenyl)(indenyl)zirconium dichloride,
methylenebis(cyclopentadienyl)zirconium dichloride,
methylenebis(2-methylcyclopentadienyl)zirconium dichloride,
methylenebis(3-methylcyclopentadienyl)zirconium dichloride,
methylenebis(2,3-dimethylcyclopentadienyl)zirconium dichloride,
methylenebis(2,4-dimethylcyclopentadienyl)zirconium dichloride, methylenebis(2,5-dimethylcyclopentadienyl)zirconium dichloride,
methylenebis(3,4-dimethylcyclopentadienyl)zirconium dichloride,
methylenebis(tetramethylcyclopentadienyl)zirconium dichloride,
methylenebis(2-n-butylcyclopentadienyl)zirconium dichloride,
methylenebis(3-n-butylcyclopentadienyl)zirconium dichloride,
methylenebis(2-t-butylcyclopentadienyl)zirconium dichloride,
methylenebis(3-t-butylcyclopentadienyl)zirconium dichloride,
methylenebis(indenyl)zirconium dichloride,
methylenebis(tetrahydroindenyl)zirconium dichloride,
methylenebis(2-methyl-1-indenyl)zirconium dichloride,
methylenebis(fluorenyl)zirconium dichloride,
methylenebis(octahydrofluorenyl)zirconium dichloride,
methylene(cyclopentadienyl)(indenyl)zirconium dichloride,
methylene(cyclopentadienyl)(tetrahydroindenyl)zirconium dichloride,
methylene(cyclopentadienyl)(fluorenyl)zirconium dichloride,
methylene(cyclopentadienyl)(octahydrofluorenyl)zirconium dichloride,
methylene(fluorenyl)(indenyl)zirconium dichloride,
ethylenebis(indenyl)zirconium dichloride,
ethylenebis(tetrahydroindenyl)zirconium dichloride,
ethylenebis(2-methyl-1-indenyl)zirconium dichloride,
ethylenebis(2-ethyl-1-indenyl)zirconium dichloride,
ethylenebis(2,4-dimethyl-1-indenyl)zirconium dichloride,
ethylenebis(2-methyl-4-phenyl-1-indenyl)zirconium dichloride,
ethylenebis(2-methyl-4-naphthyl-1-indenyl)zirconium dichloride,
ethylenebis(2-methyl-4,6-diisopropyl-1-indenyl)zirconium dichloride,
isopropylidenebis(cyclopentadienyl)zirconium dichloride,
isopropylidenebis(2-methylcyclopentadienyl)zirconium dichloride,
isopropylidenebis(3-methylcyclopentadienyl)zirconium dichloride,
isopropylidenebis(2,3-dimethylcyclopentadienyl)zirconium dichloride,
isopropylidenebis(2,4-dimethylcyclopentadienyl)zirconium dichloride,
isopropylidenebis(2,5-dimethylcyclopentadienyl)zirconium dichloride,
isopropylidenebis(3,4-dimethylcyclopentadienyl)zirconium dichloride,
isopropylidenebis(tetramethylcyclopentadienyl)zirconium dichloride,
isopropylidenebis(2-n-butylcyclopentadienyl)zirconium dichloride,
isopropylidenebis(3-n-butylcyclopentadienyl)zirconium dichloride,
isopropylidenebis(2-t-butylcyclopentadienyl)zirconium dichloride,
isopropylidenebis(3-t-butylcyclopentadienyl)zirconium dichloride,
isopropylidenebis(indenyl)zirconium dichloride,
isopropylidenebis(tetrahydroindenyl)zirconium dichloride,
isopropylidenebis(2-methyl-1-indenyl)zirconium dichloride,
isopropylidenebis (fluorenyl)zirconium dichloride,
isopropylidenebis(octahydrofluorenyl)zirconium dichloride,
isopropylidene(cyclopentadienyl)(indenyl)zirconium dichloride,
isopropylidene(cyclopentadienyl)(tetrahydroindenyl)zirconium dichloride,
isopropylidene(cyclopentadienyl)(fluorenyl) zirconium dichloride,
isopropylidene(cyclopentadienyl)(octahydrofluorenyl)zirconium dichloride,
isopropylidene(cyclopentadienyl)(2,7-dimethylfluorenyl)zirconium dichloride,
isopropylidene(cyclopentadienyl)(2,7-di-t-butylfluorenyl)zirconium dichloride,
isopropylidene(cyclopentadienyl)(2-dimethylaminofluorenyl)zirconium dichloride,
isopropylidene(cyclopentadienyl)(2-diisopropylaminofluorenyl)zirconium dichloride,
isopropylidene(cyclopentadienyl)(4-dimethylaminofluorenyl)zirconium dichloride,
isopropylidene(cyclopentadienyl)(4-diisopropylaminofluorenyl)zirconium dichloride,
isopropylidene(cyclopentadienyl)[2,7-bis(dimethylamino)fluorenyl]zirconium dichloride,
isopropylidene(cyclopentadienyl)[2,7-bis(diisopropylamino)fluorenyl]zirconium dichloride,
isopropylidene(cyclopentadienyl)(2-methoxyfluorenyl)zirconium dichloride,
isopropylidene(cyclopentadienyl)(4-methoxyfluorenyl)zirconium dichloride,
isopropylidene(cyclopentadienyl)(2,7-dimethoxyfluorenyl)zirconium dichloride,
isopropylidene(cyclopentadienyl)(2,3,7-trimethoxyfluorenyl)zirconium dichloride,
isopropylidene(fluorenyl)(indenyl)zirconium dichloride,
dimethylsilanediylbis(cyclopentadienyl)zirconium dichloride,
dimethylsilanediylbis(2-methylcyclopentadienyl)zirconium dichloride,
dimethylsilanediylbis(3-methylcyclopentadienyl)zirconium dichloride,
dimethylsilanediylbis(2,3-dimethylcyclopentadienyl)zirconium dichloride,
dimethylsilanediylbis(2,4-dimethylcyclopentadienyl)zirconium dichloride,
dimethylsilanediylbis(2,5-dimethylcyclopentadienyl)zirconium dichloride,
dimethylsilanediylbis(3,4-dimethylcyclopentadienyl)zirconium dichloride,
dimethylsilanediylbis(tetramethylcyclopentadienyl)zirconium dichloride,
dimethylsilanediylbis(2-n-butylcyclopentadienyl)zirconium dichloride, dimethylsilanediylbis(3-n-butylcyclopentadienyl) zirconium dichloride,
dimethylsilanediylbis(2-t-butylcyclopentadienyl) zirconium dichloride,
dimethylsilanediylbis(3-t-butylcyclopentadienyl) zirconium dichloride,
dimethylsilanediylbis(indenyl)zirconium dichloride,
dimethylsilanediylbis(tetrahydroindenyl)zirconium dichloride,
dimethylsilanediylbis(2-methyl-1-indenyl)zirconium dichloride,
dimethylsilanediylbis(2-ethyl-1-indenyl)zirconium dichloride,
dimethylsilanediylbis(2,4-dimethyl-1-indenyl)zirconium dichloride,
dimethylsilanediylbis(2-methyl-4-phenyl-1-indenyl) zirconium dichloride,
dimethylsilanediylbis(2-methyl-4-naphthyl-1-indenyl) zirconium dichloride,
dimethylsilanediylbis(2-methyl-4,6-diisopropyl-1-indenyl)zirconium dichloride,
dimethylsilanediylbis(fluorenyl)zirconium dichloride,
dimethylsilanediylbis(octahydrofluorenyl)zirconium dichloride,
dimethylsilanediyl(cyclopentadienyl)(indenyl)zirconium dichloride,
dimethylsilanediyl(cyclopentadienyl)(tetrahydroindenyl) zirconium dichloride,
dimethylsilanediyl(cyclopentadienyl)(fluorenyl) zirconium dichloride,
dimethylsilanediyl(cyclopentadienyl) (octahydrofluorenyl)zirconium dichloride,
dimethylsilanediyl(fluorenyl)(indenyl)zirconium dichloride,
diphenylmethylene(cyclopentadienyl)(fluorenyl) zirconium dichloride,
diphenylmethylene(cyclopentadienyl)(2,7-dimethylfluorenyl)zirconium dichloride,
diphenylmethylene(cyclopentadienyl)(2,7-di-t-butylfluorenyl)zirconium dichloride,
diphenylmethylene(cyclopentadienyl)(2-dimethylaminofluorenyl)zirconium dichloride,
diphenylmethylene(cyclopentadienyl)(2-diisopropylaminofluorenyl)zirconium dichloride,
diphenylmethylene(cyclopentadienyl)(4-dimethylaminofluorenyl)zirconium dichloride,
diphenylmethylene(cyclopentadienyl)(4-diisopropylaminofluorenyl)zirconium dichloride,
diphenylmethylene(cyclopentadienyl)[2,7-bis(dimethylamino)fluorenyl]zirconium dichloride,
diphenylmethylene(cyclopentadienyl)[2,7-bis(diisopropylamino)fluorenyl]zirconium dichloride,
diphenylmethylene(cyclopentadienyl)(2-methoxyfluorenyl)zirconium dichloride,
diphenylmethylene(cyclopentadienyl)(4-methoxyfluorenyl)zirconium dichloride,
diphenylmethylene(cyclopentadienyl)(2,7-dimethoxyfluorenyl)zirconium dichloride,
diphenylmethylene(cyclopentadienyl)(2,3,7-trimethoxyfluorenyl)zirconium dichloride,
diphenylsilanediyl(cyclopentadienyl)(fluorenyl) zirconium dichloride,
diphenylsilanediyl(cyclopentadienyl)(2,7-dimethylfluorenyl)zirconium dichloride,
diphenylsilanediyl(cyclopentadienyl)(2,7-di-t-butylfluorenyl)zirconium dichloride,
diphenylsilanediyl(cyclopentadienyl)(2-dimethylaminofluorenyl)zirconium dichloride,
diphenylsilanediyl(cyclopentadienyl)(2-diisopropylaminofluorenyl)zirconium dichloride,
diphenylsilanediyl(cyclopentadienyl)(4-dimethylaminofluorenyl)zirconium dichloride,
diphenylsilanediyl(cyclopentadienyl)(4-diisopropylaminofluorenyl)zirconium dichloride,
diphenylsilanediyl(cyclopentadienyl)[2,7-bis(dimethylamino)fluorenyl]zirconium dichloride,
diphenylsilanediyl(cyclopentadienyl)[2,7-bis(diisopropylamino)fluorenyl]zirconium dichloride,
diphenylsilanediyl(cyclopentadienyl)(2-methoxyfluorenyl)zirconium dichloride,
diphenylsilanediyl(cyclopentadienyl)(4-methoxyfluorenyl)zirconium dichloride,
diphenylsilanediyl(cyclopentadienyl)(2,7-dimethoxyfluorenyl)zirconium dichloride, and
diphenylsilanediyl(cyclopentadienyl)(2,3,7-trimethoxyfluorenyl)zirconium dichloride;
and dimethyl derivatives, diethyl derivatives, dihydro derivatives, diphenyl derivatives, and dibenzyl derivatives of the above zirconium compounds. Further, compounds derived by replacing the zirconium atom of the above zirconium compound by a titanium atom or a hafnium atom are also useful therefor. The above compounds may be used in combination of two or more thereof.

The metallocene represented by General Formula (18), (19), (20), or (21) includes dichlorides of zirconium such as
pentamethylcyclopentadienyl-di-t-butylphosphinozirconium dichloride,
pentamethylcyclopentadienyl-di-t-butylamidozirconium dichloride,
pentamethylcyclopentadienyl-n-butoxidozirconium dichloride,
dimethylsilanediyltetramethylcyclopentadienyl-t-butylamidozirconium dichloride,
dimethylsilanediyl-2-t-butylcyclopentadienyl-t-butylamidozirconium dichloride,
dimethylsilanediyl-3-t-butylcyclopentadienyl-t-butylamidozirconium dichloride,
dimethylsilanediyl-2-trimethylsilylcyclopentadienyl-t-butylamidozirconium dichloride,
dimethylsilanediyl-3-trimethylsilylcyclopentadienyl-t-butylamidozirconium dichloride,
dimethylsilanediyltetramethylcyclopentadienylphenylamidozirconium dichloride,
methylphenylsilanediyltetramethylcyclopentadienyl-t-butylamidozirconium dichloride,
dimethylsilanediyltetramethylcyclopentadienyl-p-n-butylphenylamidozirconium dichloride,
dimethylsilanediyltetramethylcyclopentadienyl-p-methoxyphenylamidozirconium dichloride,
dimethylsilanediyl-2-t-butylcyclopentadienyl-2,5-di-t-butylphenylamidozirconium dichloride,
dimethylsilanediyl-3-t-butylcyclopentadienyl-2,5-di-t-butylphenylamidozirconium dichloride, dimethylsilanediylindenyl-t-butylamidozirconium dichloride, dimethylsilanediyltetramethylcyclopentadienylcyclohexylamidozirconium dichloride, dimethylsilanediylfluorenylcyclohexylamidozirconium-dichloride, and dimethylsilanediyltetramethylcyclopentadienylcyclododecylamidozirconium dichloride;

and dimethyl derivativives, diethyl derivatives, dihydro derivatives, diphenyl derivatives, and dibenzyl derivatives of the above zirconium compounds. Further, compounds derived by replacing the zirconium atom of the above zirconium compound by a titanium atom or a hafnium atom are also useful therefor. The above compounds may be used in combination of two or more thereof.

Component [C] in the present invention is an organoaluminum compound preferably represented by General Formula (32):

$$AlR^{18}_3 \qquad (32)$$

where each $R^{18}$ is independently a hydrogen atom or a hydrocarbon group of 1 to 20 carbons, for obtaining an olefin polymer with high catalytic activity.

The organoaluminum compound represented by General Formula (32) includes trimethylaluminum, dimethylaluminum hydride, triethylaluminum, diethylaluminum hydride, tri-n-propylaluminum, di-n-propylaluminum hydride, triisopropylaluminum, diisopropylaluminum hydride, tri-n-butylaluminum, di-n-butylaluminum hydride, triisobutylaluminum, diisobutylaluminum hydride, tri-t-butylaluminum, di-t-butylaluminum hydride, tri-n-hexylaluminum, di-n-hexylaluminum hydride, triisohexylaluminum, diisohexylaluminum hydride, tri-n-octylaluminum, di-n-octylaluminum hydride, triisooctylaluminum, and diisooctylaluminum hydride.

Component [D] in the present invention is an organoalkaline earth metal compound preferably represented by General Formula (33):

$$M^6R^{19}_2 \qquad (33)$$

where each $M^6$ is an alkaline earth metal of Group 2 of Periodic Table, and each $R^{19}$ is independently a hydrocarbon group of 1 to 20 carbons; or an organozinc compound represented by General Formula (34):

$$ZnR^{20}_2 \qquad (34)$$

where each $R^{20}$ is independently a hydrocarbon group of 1 to 20 carbons, for obtaining an olefin polymer with high catalytic activity.

The organoalkaline earth metal compound represented by General Formula (33) includes magnesium such as dimethylmagnesium, ethylmethylmagnesium, methyl-n-propylmagnesium, methylisopropylmagnesium, n-butylmethylmagnesium, isobutylmethylmagnesium, t-butylmethylmagnesium, methylphenylmagnesium, diethylmagnesium, ethyl-n-propylmagnesium, ethylisopropylmagnesium, n-butylethylmagnesium, isobutylethylmagnesium, t-butylethylmagnesium, ethylphenylmagnesium, di-n-propylmagnesium, n-propylisopropylmagnesium, n-butyl-n-propylmagnesium, isobutyl-n-propylmagnesium, t-butyl-n-propylmagnesium, phenyl-n-propylmagnesium, diisopropylmagnesium, n-butylisopropylmagnesium, isobutylisopropylmagnesium, t-butylisopropylmagnesium, phenylisopropylmagnesium, di-n-butylmagnesium, n-butylisobutylmagnesium, n-butyl-t-butylmagnesium, n-butylphenylmagnesium, diisobutylmagnesium, isobutyl-t-butylmagnesium, isobutylphenylmagnesium, di-t-butylmagnesium, t-butylphenylmagnesium, and diphenylmagnesium; and compounds derived by replacing the magnesium of the above magnesium compounds by beryllium, calcium, strontium, barium, or radium. Of these, the magnesium compounds are suitable, n-butylethylmagnesium being more suitable. The above compounds may be used in combination of two or more thereof.

The organozinc compound represented by General Formula (34) includes dimethylzinc, ethylmethylzinc, methyl-n-propylzinc, methylisopropylzinc, n-butylmethylzinc, isobutylmethylzinc, t-butylmethylzinc, methylphenylzinc, diethylzinc, ethyl-n-propylzinc, ethylisopropylzinc, n-butylethylzinc, isobutylethylzinc, t-butylethylzinc, ethylphenylzinc, di-n-propylzinc, n-propylisopropylzinc, n-butyl-n-propylzinc, isobutyl-n-propylzinc, t-butyl-n-propylzinc, phenyl-n-propylzinc, diisopropylzinc, n-butylisopropylzinc, isobutylisopropylzinc, t-butylisopropylzinc, phenylisopropylzinc, di-n-butylzinc, n-butylisobutylzinc, n-butyl-t-butylzinc, n-butylphenylzinc, diisobutylzinc, isobutyl-t-butylzinc, isobutylphenylzinc, di-t-butylzinc, t-butylphenylzinc, and diphenylzinc. Of these, diethylzinc is preferable. The above compounds may be used in combination of two or more thereof.

In one embodiment of the present invention, the olefin polymerization catalyst is prepared by bringing Component [A], Component [B], and Component [C] into contact. Preferably, Component [B] and a part or the entire of Component [C] is preliminarily brought together into contact to diminish the adverse effect of impurities in Component [B], but the method of the contact is not specially limited.

In another embodiment of the present invention, the olefin polymerization catalyst is prepared by bringing Component [A], Component [B], Component [C], and Component [D] into contact. Preferably, Component [A], Component [B], and a part or the entire of Component [C] are preliminarily brought together into contact, and a part or the entire of Component [D] are brought into contact therewith to obtain high catalyst activity for olefin polymerization, but the method of the contact is not specially limited.

The solvent for the contact of the catalyst components includes aliphatic hydrocarbons such as butane, pentane, hexane, heptane, octane, nonane, decane, cyclopentane, and cyclohexane; aromatic hydrocarbons such as benzene, toluene, and xylene; ethers such as ethyl ether, and n-butyl ether; halogenated hydrocarbons such as methylene chloride and chloroform; 1,4-dioxane, acetonitrile, and tetrahydrofuran.

The temperature of the contact ranges preferably from 0 to 200° C.

The amounts of the catalyst components to be used are in the ranges below for higher catalyst activity and lower ash content of the produced polymer. For 1 gram of Component [B], Component [A] ranges from 0.0001 to 100 mmol, preferably from 0.001 to 10 mmol; Component [C] ranges from 0.001 to 10000 mmol, preferably from 0.01 to 1000 mmol; and Component [D], when it is used, ranges from 0.0001 to 1000 mmol, preferably from 0.001 to 100 mmol. The molar ratio of Component [A] to Component [C] ranges from 1:0.1 to 1:10000, preferably 1:1 to 1:1000. The molar ratio of Component [A] to Component [D] ranges from 1:0.1 to 1:10000, preferably from 1:1 to 1:1000.

The catalyst prepared as above may used without washing, or after washing. If necessary, Component [C] or Component [D] may be further supplemented to the prepared catalyst. The amount of the supplemented Component [C] is decided to obtain the molar ratio of Component [A] to Component [C] in the range from 1:0 to 1:10000, and the amount of the supplemented Component [D] is decided to obtain the molar ratio of Component [A] to Component [D] in the range from 1:0 to 1:10000.

The catalyst, before use for a catalyst for olefin polymer production, may be treated by preliminary polymerization of olefin such as ethylene, propylene, 1-butene, 1-hexene, 1-octene, 4-methyl-1-pentene, 3-methyl-1-butene, vinylcycloalkane, and styrene, and if necessary, be washed. This preliminary polymerization is preferably conducted in an inert solvent to form a polymer in an amount ranging from 0.01 to 1000 g, preferably from 0.1 to 100 g per gram of the catalyst.

An olefin polymer is produced, in the present invention, by homopolymerization of an olefin or copolymerization of olefins with the aforementioned catalyst in a solution state, a suspension state, or a gas state.

The polymerization is conducted at a polymerization temperature ranging from −70 to 300° C., preferably from 0 to 250° C., at a polymerization pressure ranging from 0.5 to 3000 kgf/cm$^2$, preferably from 1 to 2000 kgf/cm2. Hydrogen may be introduced as a molecular weight controlling agent into the polymerization system.

The olefin polymerizable in the present invention includes α-olefin such as ethylene, propylene, 1-butene, 1-hexene, 1-octene, 4-methyl-1-pentene, 3-methyl-1-butene, and vinylcycloalkane; cyclic olefins such as norbornene, and norbornadiene; dienes such as butadiene, 1,4-hexadiene; and styrene, but is not limited thereto. The olefin may be a mixture of two or more thereof.

In the polymerization in a solution state, or a suspension state, in the present invention, the polymerization solvent may be any organic solvent employed generally, specifically including halogenated hydrocarbons such as chloroform, methylene chloride, and carbon tetrachloride; aliphatic hydrocarbons of 3 to 20 carbons such as propane, n-butane, isobutane, n-pentane, n-hexane, n-heptane, n-octane, n-nonane, and n-decane; and aromatic hydrocarbons of 6 to 20 carbons such as benzene, toluene, and xylene. Otherwise, the olefin itself may be utilized as the solvent.

Examples

The present invention is described below more specifically by reference to Examples without limiting the invention.

The reduction treatment, the salt treatment, the Lewis base treatment, the catalyst preparation, the polymerization reaction, and the solvent purification were all conducted in an inert gas atmosphere. The solvents for the reduction treatment, the salt treatment, the Lewis base treatment, the catalyst preparation, and the polymerization reaction were all purified, dried, and deoxygenated in a conventional manner preliminarily. The metallocene for the catalyst preparation was synthesized and identified in a conventional manner. Other reagents employed were as follows: molybdenum disulfide (99.5%, produced by Kishida Kagaku K.K.), tantalum disulfide (99.9%, produced by Soekawa Rikagaku K.K.), titanium disulfide (99.9%, produced by Soekawa Rikagaku K.K.), molybdenum trioxide (99.9%, produced by Kojundo-kagaku Kenkyusho K.K.), divanadium pentaoxide (99.0%, produced by Kishida Kagaku K.K.), molybdenum dioxide (99%, produced by Mitsuwa Kagaku Yakuhin K.K.), hexamolybdenum octasulfide (synthesized and identified according to the method of J. M. Tarascon: Solid State Communications, Vol. 47, No. 12, 973–979 (1983)), n-butyllithium solution in n-hexane (produced by Kanto Kagaku K.K.), triethylaluminum solution in toluene (1.44 M, produced by Tosoh Akuzo K.K.), triisbutylaluminum solution in toluene (0.848 M, produced by Tosoh Akuzo K.K.), and trimethylaluminum solution in toluene (2.4 M, produced by Tosoh Akuzo K.K.),n-butylethylmagnesium solution in heptane (1.47 M, trade name: MAGALA BEM-2141, Mg: 4.22 wt %, Al: 0.13 wt %, produced by Tosoh Akuzo K.K.), and diethylzinc solution in hexane (1.02 M, procduced by Kanto Kagaku K.K.).

The properties of the copolymers obtained in Examples were measured by the following methods. The weight-average molecular weight (Mw), the number-average-molecular weight (Mn), and the molecular weight distribution (Mw/Mn) were measured by gel permeation chromatography with a GPC apparatus (Model 150C ALC/GPC, manufactured by Waters Co.) with a column GMH-HR-H(S) (produced by Tosoh K.K.) at a column temperature of 145° C. with o-dichlorobenzene as the elution solvent, with calibration of the molecular weight by standard polystyrene samples according to the universal calibration method. The melting point was measured with a differential scanning calorimeter (DSC-500, manufactured by Seiko Densi Kogyo K.K.).

Preparation of Components (B) employed in Examples 1–84:

I. Preparation of B-1

[Reduction of molybdenum disulfide]

To 5.0 g (31 mmol) of molybdenum disulfide, was added 100 mL of n-hexane. Thereto, 40 mL (64 mmol) of an n-butyllithium solution (1.59 M) in n-hexane was added dropwise. The suspension was stirred at room temperature for 7 days. Then the supernatant was removed. The solid matter was washed with 500 mL of n-hexane, and was dried at room temperature at $10^{-3}$ Torr to obtain a black solid matter. The obtained reduction product had composition of $(Li^+)_{1.2}[MoS_2]^{1.2-}$ according to elemental analysis.

[Salt treatment]

In 150 mL of water, was dissolved 5 g (32 mmol) of dimethylaniline hydrochloride. To this aqueous solution, 2.5 g of the above reduction product was added. This suspension was stirred at room temperature for 24 hours. Then the supernatant was removed. The solid matter was washed with 500 mL of ethyl alcohol, and was dried at room temperature at $10^{-3}$ Torr for 24 hours to obtain B-1. The obtained product had composition of $[Ph(Me)_2NH^+]_{0.12}[MoS_2]^{0.12-}$ according to elemental analysis.

II. Preparation of B-2

[Salt treatment]

In 150 mL of tetrahydrofuran, was dissolved 3 g (13.5 mmol) of dimethylaniline perchlorate. To this solution, was added 1.1 g of the reduction product prepared in [Reduction of molybdenum disulfide] in (I) Preparation of B-1 above. This suspension was stirred at room temperature for 24 hours. Then the supernatant was removed. The solid matter was washed with 500 mL of tetrahydrofuran, and was dried at room temperature at $10^{-3}$ Torr for 24 hours to obtain B-2. The obtained product had composition of $[Ph(Me)_2NH^+]_{0.01}[MoS_2]^{0.01-}$ according to elemental analysis.

III. Preparation of B-3

[Reduction of molybdenum disulfide]

To 5.0 g (31 mmol) of molybdenum disulfide, was added 100 mL of n-hexane. Thereto, 22 mL (32 mmol) of an n-butyllithium solution (1.47 M) in n-hexane was added dropwise. The suspension was stirred at room temperature for 24 hours. Then the supernatant was removed. The solid matter was washed with 500 mL of n-hexane, and was dried at room temperature at $10^{-3}$ Torr to obtain a black solid matter. The obtained reduction product had composition of (Li$^+$) [MoS$_2$] according to elemental analysis.

[Salt treatment]

In 150 mL of water, was dissolved 5 g (32 mmol) of dimethylaniline Hydrochloride. To this aqueous solution, 5 g of the above reduction product was added. This suspension was stirred at room temperature for 24 hours. Then the supernatant was removed. The solid matter was washed with 500 mL of ethyl alcohol, and was dried at room temperature at $10^{-3}$ Torr for 24 hours to obtain B-3. The obtained product had composition of [Ph(Me)$_2$NH$^+$]$_{0.13}$[MoS$_2$]$^{0.13-}$ according to elemental analysis.

IV. Preparation of B-4

[Reduction of molybdenum disulfide]

To 10 g (65 mmol) of molybdenum disulfide, was added 150 mL of n-hexane. Thereto, 22 mL (32 mmol) of an n-butyllithium solution (1.47 M) in n-hexane was added dropwise. The suspension was stirred at room temperature for 24 hours. Then the supernatant was removed. The solid matter was washed with 500 mL of n-hexane, and was dried at room temperature at $10^{-3}$ Torr to obtain a black solid matter. The obtained reduction product had composition of (Li$^+$)$_{0.57}$[MoS$_2$]$^{0.57-}$ according to elemental analysis.

[Salt treatment]

In 200 mL of water, was dissolved 2.8 g (18 mmol) of dimethylaniline hydrochloride. To this aqueous solution, 5 g of the above reduction product was added. This suspension was stirred at room temperature for 24 hours. Then the supernatant was removed. The solid matter was washed with 500 mL of ethyl alcohol, and was dried at room temperature at $10^{-3}$ Torr for 24 hours to obtain B-4. The obtained product had composition of [Ph(Me)$_2$NH$^+$]$_{0.055}$[MOS$_2$]$^{0.055-}$ according to elemental analysis.

V. Preparation of B-5

[Lewis base treatment]

To 7 g of the reduction product obtained in [Reduction of molybdenum disulfide] in (I) Preparation of B-1, was added 130 mL of aqueous 25% ammonia solution. This suspension was stirred at $-30°$ C. for 3 hours. The supernatant was removed, and the solid matter was washed with 500 mL of water.

[Salt treatment]

In 230 mL of water, was dissolved 3.3 g (21 mmol) of dimethylaniline hydrochloride. To this aqueous solution, ½ portion of the above Lewis base treatment product was added. This suspension was stirred at room temperature for 24 hours. Then the supernatant was removed. The solid matter was washed with 500 mL of water and 500 mL of ethyl alcohol successively, and was dried at room temperature at 10–3 Torr for 24 hours to obtain B-5. The obtained product had composition of [Ph(Me)$_2$NH$^+$]$_{0.055}$[MoS$_2$]$^{0.055-}$ according to elemental analysis.

VI. Preparation of B-6

[Reduction of molybdenum disulfide]

To 6.3 g (39 mmol) of molybdenum disulfide, was added 60 mL of n-hexane. Thereto, 20 mL (31 mmol) of an n-butyllithium solution (1.56 M) in n-hexane was added dropwise. The suspension was stirred at room temperature for 24 hours. Thereafter the supernatant was removed. The solid matter was washed with 500 mL of n-hexane, and was dried at room temperature at $10^{-3}$ Torr, and then at 75–85° C. at $10^{-3}$ Torr to obtain a black solid matter.

[Lewis base treatment]

To 6 g of the above reduction product, was added 100 mL of aqueous 25% ammonia solution. This suspension was stirred at $-30°$ C. for 3 hours. The supernatant was removed. The solid matter was washed with 500 mL of water.

[Salt treatment]

In 200 mL of water, was dissolved 3.0 g (19 mmol) of dimethylaniline hydrochloride. To this aqueous solution, a ½ portion of the above Lewis base treatment product was added. This suspension was stirred at room temperature for 24 hours. Then the supernatant was removed. The solid matter was washed with 500 mL of water and 500 mL of ethyl alcohol successively, and was dried at room temperature at $10^{-3}$ Torr for 24 hours to obtain B-6. The obtained product had composition of [Ph(Me)$_2$NH$^+$]$_{0.14}$[MoS$_2$]$^{0.14-}$ according to elemental analysis.

VII. Preparation of B-7

[Lewis base treatment]

To 7 g of the reduction product obtained in [Reduction of molybdenum disulfide] in (IV) Preparation of B-4, was added 100 mL of aqueous 25% ammonia solution. This suspension was stirred at $-30°$ C. for 3 hours. The supernatant was removed, and the solid matter was washed with 500 mL of water.

[Salt treatment]

In 230 mL of water, was dissolved 3.3 g (21 mmol) of dimethylaniline hydrochloride. To this aqueous solution, ½ portion of the above Lewis base treatment product was added. This suspension was stirred at room temperature for 24 hours. Then the supernatant was removed. The solid matter was washed with 500 mL of water and 500 mL of ethyl alcohol successively, and was dried at room temperature at $10^{-3}$ Torr for 24 hours to obtain B-7. The obtained product had composition of [Ph(Me)$_2$NH$^+$]$_{0.09}$[MoS$_2$]$^{0.09-}$ according to elemental analysis.

VIII. Preparation of B-8

[Lewis base treatment]

To 7 g of the reduction product obtained in [Reduction of molybdenum disulfide] in (I) Preparation of B-1, was added 100 mL of aqueous 25% ammonia solution. This suspension was stirred at $-30°$ C. for 0.5 hour. The supernatant was removed, and the solid matter was washed with 500 mL of water.

[Salt treatment]

In 460 mL of water, was dissolved 7.1 g (45 mmol) of dimethylaniline hydrochloride. To this aqueous solution, the entire of the above Lewis base treatment product was added. This suspension was stirred at room temperature for 24 hours. Then the supernatant was removed. The solid matter was washed at 5° C. with 500 mL of water and 500 mL of ethyl alcohol successively, and was dried at 5° C. at $10^{-3}$ Torr for 24 hours to obtain B-8. The obtained product had composition of [Ph(Me)$_2$NH$^+$]$_{0.12}$[MoS]$^{0.12-}$ according to elemental analysis.

IX. Preparation of B-9

[Reduction of molybdenum disulfide]

To 12 g (75 mmol) of molybdenum disulfide, was added 100 mL of n-hexane. Thereto, 50 mL (77 mmol) of an n-butyllithium solution (1.54 M) in n-hexane was added dropwise. The suspension was stirred at room temperature for 5 days. Thereafter the supernatant was removed. The solid matter was washed with 500 mL of n-hexane, and was dried at room temperature at $10^{-3}$ Torr, and then at 75–85° C. at $10^{-3}$ Torr to obtain a black solid matter.

[Lewis base treatment]

To 4 g of the above reduction product, was added 50 mL of aqueous 0.25% ammonia solution. This suspension was stirred at $-10°$ C. for 3 hours. The supernatant was removed. The solid matter was washed with 300 mL of water.

[Salt treatment]

In 140 mL of water, was dissolved 3.9 g (25 mmol) of dimethylaniline hydrochloride. To this aqueous solution, the entire of the above Lewis base treatment product was added. This suspension was stirred at room temperature for 24 hours. Then the supernatant was removed. The solid matter was washed with 500 mL of water and 500 mL of ethyl alcohol successively, and was dried at room temperature at $10^{-3}$ Torr for 24 hours to obtain B-9. The obtained product had composition of $[Ph(Me)_2NH^+]_{0.24}[(MoS_2)]^{0.24-}$ according to elemental analysis.

X. Preparation of B-10

[Lewis base treatment]

To 4 g of the reduction product obtained in [Reduction of molybdenum disulfide] in (IX) Preparation of B-9, was added 50 mL of water. This suspension was stirred at 4° C. for 3 hours. The supernatant was removed, and the solid matter was washed with 300 mL of water.

[Salt treatment]

In 110 mL of water, was dissolved 3.9 g (25 mmol) of dimethylaniline hydrochloride. To this aqueous solution, the entire of the above Lewis base treatment product was added. This suspension was stirred at room temperature for 3 days. Then the supernatant was removed. The solid matter was washed with 500 mL of water and 500 mL of ethyl alcohol successively, and was dried at 5° C. at $10^{-3}$ Torr for 24 hours to obtain B-10. The obtained product had composition of $[Ph(Me)_2NH^+]_{0.17}[MoS_2]^{0.17-}$ according to elemental analysis.

XI. Preparation of B-11

[Lewis base treatment]

To 7 g of the reduction product obtained in [Reduction of molybdenum disulfide] in (I) Preparation of B-1, was added a solution of 383 mmol of t-butylamine in 100 mL of water. This suspension was stirred at 5° C. for 3 hours. The supernatant was removed, and the solid matter was washed with 300 mL of water at 5° C.

[Salt treatment]

In 460 mL of water, was dissolved 9.2 g (58 mmol) of dimethylaniline hydrochloride. To this aqueous solution, the entire of the above Lewis base treatment product was added. This suspension was stirred at 5° C. for 24 hours. Then the supernatant was removed. The solid matter was washed with 300 mL of water at 5° C., and 300 mL of ethyl alcohol at 5° C. successively, and was dried at 5° C. at $10^{-3}$ Torr for 24 hours to obtain B-11. The obtained product had composition of $[Ph(Me)_2NH^+]_{0.23}[MoS_2]^{0.23-}$ according to elemental analysis.

XII. Preparation of B-12

[Salt treatment]

In 230 mL of water, was dissolved 4.4 g (20 mmol) of dodecylamine hydrochloride. To this aqueous solution, was added a ½ portion of the Lewis base treatment product obtained in [Lewis base treatment] in (V) Preparation of B-5. This suspension was stirred at room temperature for 24 hours. Then the supernatant was removed. The solid matter was washed with 500 mL of water, and 500 mL of ethyl alcohol successively, and was dried at room temperature at $10^{-3}$ Torr for 24 hours to obtain B-12. The obtained product had composition of $[CH_3(CH_2)_{11}NH_3^+]_{0.30}[MOS_2]^{0.30-}$ according to elemental analysis.

XIII. Preparation of B-13

[Salt treatment]

In 230 mL of water, was dissolved 4.4 g (20 mmol) of dodecylamine hydrochloride. To this solution, was added a ½ portion of the Lewis base treatment product prepared in [Lewis base treatment] in (VI) Preparation of B-6. This suspension was stirred at room temperature for 24 hours. Then the supernatant was removed. The solid matter was washed with 500 mL of water and 500 mL of ethyl alcohol successively, and was dried at room temperature at $10^{-3}$ Torr for 24 hours to obtain B-13. The obtained product had composition of $[CH_3(CH_2)_{11}NH_3^+]_{0.21}[MoS_2]^{0.21-}$ according to elemental analysis.

XIV. Preparation of B-14

[Lewis base treatment]

To 7 g of the reduction product obtained in [Reduction of molybdenum disulfide] in (VI) Preparation of B-6, was added an aqueous 25% ammonia solution. This suspension was stirred at −30° C. for 3 hours. The supernatant was removed, and the solid matter was washed with 500 mL of water at 5° C.

[Salt treatment]

In 960 mL of water, was suspended 13.7 g (41 mmol) of dimethyloctadecylamine hydrochloride. To this suspension, the entire of the above Lewis base treatment product was added. This suspension was stirred at room temperature for 24 hours. Then the supernatant was removed. The solid matter was washed with 500 mL of water, and 500 mL of ethyl alcohol successively, and was dried at room temperature at $10^{-3}$ Torr for 24 hours to obtain B-14. The obtained product had composition of $[CH_3(CH_2)_{17}N(CH_3)_2H^+]_{0.23}[MoS_2]^{0.23-}$ according to elemental analysis.

XV. Preparation of B-15

[Salt treatment]

In 120 mL of ethyl alcohol, was dissolved 8.3 (14.5 mmol) of methyldioctadecylamine hydrochloride. To this solution, 120 mL of water was added, and thereto a ½ portion of the Lewis base treatment product prepared in [Lewis base treatment] in (XIV) Preparation of B-14. This suspension was stirred at 70° C. for 1.5 hours. Then the supernatant was removed. The solid matter was washed with 300 mL of ethyl alcohol, and was dried at room temperature at $10^{-3}$ Torr for 5 hours to obtain B-15. The obtained product had composition of $[\{CH_3(CH_2)_{17}\}_2N(CH_3)H^+]_{0.18}[MoS_2]^{0.18-}$ according to elemental analysis.

XVI. Preparation of B-16

[Salt treatment]

In 150 mL of water, was dissolved 5.8 g (25 mmol) of zirconium tetrachloride. To this aqueous solution, was added the entire of the Lewis base treatment product prepared in the same manner as in [Lewis base treatment] in (IX) Preparation of B-9. This suspension was stirred at room temperature for 24 hours. Then the supernatant was removed. The solid matter was washed with 100 mL of water and 100 mL of ethyl alcohol successively, and was dried at room temperature at $10^{-3}$ Torr for 3 hours, and then at 200° C. at $10^{-3}$ Torr for 3 hours to obtain B-16.

XVII. Preparation of B-17

[Salt treatment]

In 150 mL of water, was dissolved 6.8 g (25 mmol) of ferric chloride hexahydrate. To this aqueous solution, was added the entire of the Lewis base treatment product prepared in the same manner as in [Lewis base treatment] in (IX) Preparation of B-9. This suspension was stirred at room temperature for 24 hours. Then the supernatant was removed. The solid matter was washed with 100 mL of water and 100 mL of ethyl alcohol successively, and was dried at room temperature at $10^{-3}$ Torr for 3 hours, and then at 180–190° C. at $10^{-3}$ Torr for 3 hours to obtain B-17.

XVIII. Preparation of B-18

The product B-17 was further dried at 500° C. at $10^{-3}$ Torr for 3 hours to obtain B-18.

XIX. Preparation of B-19
[Salt treatment]
In 150 mL of water, was dissolved 6.0 g (25 mmol) of aluminum trichloride hexahydrate. To this aqueous solution, was added the entire of the Lewis base treatment product prepared in the same manner as in [Lewis base treatment] in (IX) Preparation of B-9. This suspension was stirred at room temperature for 24 hours. Then the supernatant was removed. The solid matter was washed with 100 mL of water and 100 mL of ethyl alcohol successively, and was dried at room temperature at $10^{-3}$ Torr for 3 hours, and then at 180–190° C. at $10^{-3}$ Torr for 3 hours to obtain B-19.

XX. Preparation of B-20
[Salt treatment]
In 150 mL of water, was dissolved 5.0 g (25 mmol) of ferrous chloride tetrahydrate. To this aqueous solution, was added the entire of the Lewis base treatment product prepared in the same manner as in [Lewis base treatment] in (IX) Preparation of B-9. This suspension was stirred at room temperature for 24 hours. Then the supernatant was removed. The solid matter was washed with 100 mL of water and 100 mL of ethyl alcohol successively, and was dried at room temperature at $10^{-3}$ Torr for 3 hours, and then at 160–170° C. at $10^{-3}$ Torr for 3 hours to obtain B-20.

XXI. Preparation of B-21
[Salt treatment]
In 150 mL of water, was dissolved 4.2 g (25 mmol) of silver nitrate. To this aqueous solution, was added the entire of the Lewis base treatment product prepared in the same manner as in [Lewis base treatment] in (IX) Preparation of B-9. This suspension was stirred at room temperature for 24 hours. Then the supernatant was removed. The solid matter was washed with 100 mL of water and 100 mL of ethyl alcohol successively, and was dried at room temperature at $10^{-3}$ Torr for 3 hours, and then at 160–170° C. at $10^{-3}$ Torr for 3 hours to obtain B-21.

XXII. Preparation of B-22
[Salt treatment]
In 200 mL of water, was dissolved 2.2 mL (25 mmol) of concentrated hydrochloric acid. To this aqueous solution, was added the entire of the Lewis base treatment product prepared in the same manner as in [Lewis base treatment] in (IX) Preparation of B-9. This suspension was stirred at room temperature for 24 hours. Then the supernatant was removed. The solid matter was washed with 100 mL of water and 100 mL of ethyl alcohol successively, and was dried at room temperature at $10^{-3}$ Torr for 3 hours, and then at 200° C. at $10^{-3}$ Torr for 3 hours to obtain B-22.

Tables 1–3 summarize the preparation conditions of the above components [B].

XXIII. Preparation of B-23
[Salt treatment]
In 500 mL of ethyl alcohol, was dissolved 3.1 g (19 mmol) of dimethylaniline hydrochloride. To this solution, was added 3.1 g of the product B-12 prepared in the same manner as in (XII) Preparation of B-12. This suspension was stirred at 4° C. for 24 hours. Then the supernatant was removed. The solid matter was washed with 500 mL of water and 500 mL of ethyl alcohol successively, and was dried at room temperature at $10^{-3}$ Torr for 24 hours to obtain B-23. The obtained product had composition of $[Ph(Me)_2NH^+]_{0.18}[CH_3(CH_2)_{11}NH_3^+]_{0.02}[MoS_2]^{0.02-}$ according to elemental analysis.

XXIV. Preparation of B-24
[Reduction of tantalum disulfide]
To 2 g (8.2 mmol) of tantalum disulfide, was added 20 mL of n-hexane. Thereto, 11 mL (16 mmol) of an n-butyllithium solution (1.47 M) in n-hexane was added dropwise. The suspension was stirred at room temperature for 9 days. Then the supernatant was removed. The solid matter was washed with 200 mL of n-hexane, and was dried at room temperature at $10^{-3}$ Torr to obtain a brown solid matter. The obtained reduction product had composition of $(Li^+)_{1.55}[TaS_2]^{1.55-}$ according to elemental analysis.

[Salt treatment]
In 50 mL of water, was dissolved 1.2 g (7.6 mmol) of dimethylaniline hydrochloride. To this aqueous solution, 1 g of the above reduction product was added. This suspension was stirred at room temperature for 24 hours. Then the supernatant was removed. The solid matter was washed with 200 mL of ethyl alcohol, and was dried at room temperature at $10^{-3}$ Torr for 24 hours to obtain B-24. The obtained product had composition of $[Ph(Me)_2NH^+]_{0.16}[TaS_2]^{0.16-}$ according to elemental analysis.

XXV. Preparation of B-25
[Reduction of tantalum disulfide]
To 5.1 g (21 mmol) of tantalum disulfide, was added 100 mL of n-hexane. Thereto, 15 mL (22 mmol) of an n-butyllithium solution (1.47 M) in n-hexane was added dropwise. The suspension was stirred at room temperature for 24 hours. Then the supernatant was removed. The solid matter was washed with 500 mL of n-hexane, and was dried at room temperature at $10^{-3}$ Torr to obtain a brown solid matter.

[Lewis base treatment]
To 5 g of the above reduction product, was added 100 mL of aqueous 25% ammonia solution. This suspension was stirred at −30° C. for 3 hours. The supernatant was removed. The solid matter was washed with 500 mL of water.

[Salt treatment]
In 500 mL of water, was dissolved 6.8 q (43 mmol) of dimethylaniline hydrochloride. To this aqueous solution, the entire of the above Lewis base treatment product was added. This suspension was stirred at room temperature for 24 hours. Then the supernatant was removed. The solid matter was washed with 500 mL of ethyl alcohol, and was dried at room temperature at $10^{-3}$ Torr for 24 hours to obtain B-25. The obtained product had composition of $[Ph(Me)_2NH^+]_{0.21}[TaS_2]^{0.21-}$ according to elemental analysis.

XXVI. Preparation of B-26
[Reduction of tantalum disulfide]
To 5.0 g (20 mmol) of tantalum disulfide, was added 50 mL of tetrahydrofuran. Thereto, 163 mL (16.3 mmol) of a naphthalenelithium solution (0.1 M) in tetrahydrofuran was added dropwise. The suspension was stirred at room temperature for 4 days. Then the supernatant was removed. The solid matter was washed with 500 mL of tetrahydrofuran.

[Salt treatment]
In 460 mL of tetrahydrofuran, was dissolved 9.0 g (41 mmol) of dimethylaniline perchlorate. To this solution, the entire of the above reduction product was added. This suspension was stirred at room temperature for 2 days. Then the supernatant was removed. The solid matter was washed with 1 L of tetrahydrofuran, and was dried at room temperature at $10^{-3}$ Torr for 24 hours to obtain B-26. The obtained product had composition of $[Ph(Me)_2NH^+]_{0.10}[TaS_2]^{0.10-}$ according to elemental analysis.

XXVII. Preparation of B-27
[Reduction of titanium disulfide]
To 5.2 g (47 mmol) of titanium disulfide, was added 400 mL of n-hexane. Thereto, 59 mL (94 mmol) of an n-butyllithium solution (1.59 M) in n-hexane was added dropwise. The suspension was stirred at room temperature for 6 days. Then the supernatant was removed. The solid matter was washed with 500 mL of n-hexane, and was dried at room temperature at $10^{-3}$ Torr.

[Lewis base treatment]

To 2.6 g of the above reduction product, was added 200 mL of water. This suspension was stirred at room temperature for 3 hours. The supernatant was removed. The solid matter was dried at room temperature at $10^{-3}$ Torr.

[Salt treatment]

In 300 mL of water, was dissolved 3.1 g (19 mmol) of dimethylaniline hydrochloride. To this aqueous solution, 1.5 g of the above Lewis base treatment product was added. This suspension was stirred at room temperature for 24 hours. Then the supernatant was removed. The solid matter was washed with 500 mL of ethyl alcohol, and was dried at room temperature at $10^{-3}$ Torr for 24 hours to obtain B-27.

XXVIII. Preparation of B-28

[Reduction of molybdenum trioxide]

In 100 mL of water, was dissolved 18 g (103 mmol) of sodium dithionite. To this solution, was added 10 g (69.5 mmol) of molybdenum trioxide. The mixture was stirred at room temperature for one hour. The solid matter was collected by filtration in the air.

[Salt treatment]

In 50 mL of water, was dissolved 8.2 g (52 mmol) of dimethylaniline hydrochloride. To this aqueous solution, 2.5 g of the above reduction product was added. This suspension was stirred at room temperature for 3 hours. Then the solid matter was collected by filtration in the air, washed with 200 mL of ethyl alcohol, and dried at room temperature at $10^{-3}$ Torr for 24 hours to obtain B-28.

XXIX. Preparation of B-29

[Acid treatment]

To 100 mL of 1N hydrochloric acid, was added 2.5 g of the reduction product obtained in [Reduction of molybdenum trioxide in (XXVIII) Preparation of B-28. The suspension was stirred at a room temperature for 3 hours. Then the solid matter was collected by filtration in the air, washed with 200 mL of ethyl alcohol, and dried at room temperature at $10^{-3}$ Torr for 24 hours to obtain B-29.

XXX. Preparation of B-30

[Lewis base treatment]

In 130 mL of ethyl alcohol, was dissolved 6.7 mL (52 mmol) of dimethylaniline. To this solution, 2.5 g of B-29 prepared in XXIX. The suspension was stirred at room temperature for 48 hours. Then the solid matter was collected by filtration in the air, washed with 200 mL of ethyl alcohol, and dried at room temperature at $10^{-3}$ Torr for 24 hours to obtain B-30.

XXXI. Preparation of B-31

[Reduction of divanadium pentaoxide]

To 6.0 g (33 mmol) of divanadium pentaoxide, was added 250 mL of n-hexane. Thereto, 41 mL (65 mmol) of an n-butyllithium solution (1.52 M) in n-hexane was added dropwise. The suspension was stirred at room temperature for 14 days. Then the supernatant was removed. The solid matter was washed with 500 mL of n-hexane, and was dried at room temperature at $10^{-3}$ Torr to obtain a black solid matter.

[Salt treatment]

In 200 mL of water, was dissolved 5.3 g (32 mmol) of dimethylaniline hydrochloride. To this aqueous solution, 3.1 g of the above reduction product was added. This suspension was stirred at room temperature for 24 hours. Then the supernatant was removed. The solid matter was washed with 500 mL of water and 500 mL of ethyl alcohol, and was dried at room temperature at $10^{-3}$ Torr for 24 hours to obtain B-31.

XXXII. Preparation of B-32

[Reduction of molybdenum dioxide]

To 5.0 g (39 mmol) of molybdenum dioxide, was added 100 mL of n-hexane. Thereto, 51 mL (78 mmol) of an n-butyllithium solution (1.53 M) in n-hexane was added dropwise. The suspension was stirred at room temperature for 3 days. Then the supernatant was removed. The solid matter was washed with 500 mL of n-hexane, and was dried at room temperature at $10^{-3}$ Torr, and then at 75–85° C. at $10^{-3}$ Torr to obtain a black solid matter.

(Lewis base treatment]

To 5 g of the above reduction product, was added 100 mL of aqueous 25% ammonia solution. This suspension was stirred at −30° C. for 3 hours. The supernatant was removed. The solid matter was washed with 500 mL of water.

[Salt treatment]

In 460 mL of water, was dissolved 7.3 g (46 mmol) of dimethylaniline hydrochloride. To this aqueous solution, the entire of the above Lewis base treatment product was added. This suspension was stirred at room temperature for 24 hours. Then the supernatant was removed. The solid matter was washed with 1 L of ethyl alcohol, and was dried at room temperature at $10^{-3}$ Torr for 24 hours to obtain B-32.

XXXIII. Preparation of B-33

[Reduction of hexamolybdenum octasulfide]

To 1.0 g (1.2 mmol) of hexamolybdenum octasulfide, was added 10 mL of n-hexane. Thereto, 2.5 mL (3.8 mmol) of an n-butyllithium solution (1.53 M) in n-hexane was added dropwise. The suspension was stirred at room temperature for 24 hours. Then the supernatant was removed. The solid matter was washed with 20 mL of n-hexane, and was dried at room temperature at $10^{-3}$ Torr, and then at 75–85° C. at $10^{-3}$ Torr to obtain a black solid matter.

[Lewis base treatment]

To 1.0 g of the above reduction product, was added 25 mL of aqueous 25% ammonia solution. This suspension was stirred at −30° C. for 2 hours. The supernatant was removed. The solid matter was washed with 100 mL of water.

[Salt treatment]

In 50 mL of water, was dissolved 0.2 g (1.2 mmol) of dimethylaniline hydrochloride. To this aqueous solution, the entire of the above Lewis base treatment product was added. This suspension was stirred at room temperature for 24 hours. Then the supernatant was removed. The solid matter was washed with 50 mL of water, and 50 mL of ethyl alcohol successively, and was dried at room temperature at $10^{-3}$ Torr for 24 hours to obtain B-33.

XXXIV. Preparation of B-34

[Salt treatment]

In 50 mL of water, was dissolved 0.3 g (1.2 mmol) of ferric chloride hexahydrate. To this aqueous solution, was added the entire of the Lewis base treatment product prepared in the same manner as in [Lewis base treatment] in (XXXIII) Preparation of B-33. This suspension was stirred at room temperature for 24 hours. Then the supernatant was removed. The solid matter was washed with 50 mL of water and 50 mL of ethyl alcohol successively, and was dried at 200° C. at $10^{-3}$ Torr for 3 hours to obtain B-34.

Table 4 shows the preparation conditions of the components [B] of B-24 to B-34.

XXXV. Preparation of B-35

[Preparation of hexamolybdenum octasulfide]

A mixture of 1.27 g (20 mmol) of copper, 5.76 g (60 mmol) of molybdenum, and 2.55 g (78 mmol) of sulfur was enclosed in a quartz ampoule, and was heated at 1000° C. for 24 hours to obtain B-35.

XXXVI. Preparation of B-36

[Acid treatment]

In 50 mL of water, was dissolved 0.3 mL (1.2 mmol) of concentrated hydrochloric acid. To this aqueous solution 1.0 g of B-35 prepared in XXXV was added. The resulting suspension was stirred at room temperature for 3 days. The supernatant was removed. The solid matter was washed with 50 mL of water and 50 mL of ethyl alcohol successively, and was dried at room temperature at $10^{-3}$ Torr for 6 hours to obtain B-36.

Example 1

[Catalyst preparation]

In a 100-mL glass vessel, were placed 168 mg of B-1, and 10 mL of toluene. Thereto, were added 0.21 mL (0.3 mmol) of a triethylaluminum solution (1.44 M) in toluene, and 0.39 mg (1 µmol) of bis(indenyl)zirconium dichloride. The mixture was stirred for 15 hours to obtain a catalyst slurry.

[Ethylene polymerization]

In a 2-liter autoclave, were placed 500 mL of toluene and 0.14 mL (0.2 mmol) of a triethylaluminum solution (1.44 M) in toluene. The mixture was stirred at room temperature for 5 minutes. The entire of the above catalyst slurry was put into this autoclave. The inside temperature of the autoclave was raised to 75° C. with stirring. Then ethylene was introduced to a partial pressure of 20 kgf/cm² to start polymerization. During the polymerization, ethylene was introduced continuously to keep the ethylene partial pressure at 20 kgf/cm², and the polymerization temperature was controlled to be at 80° C. After 60 minutes of polymerization, 3 mL of ethyl alcohol was introduced into the autoclave to decompose the catalyst to stop the polymerization. The autoclave was degassed to the internal pressure of 0 kgf/cm². The formed ethylene polymer was collected by filtration, and was dried at 80° C. in vacuo for one day. Thereby, 31 g of ethylene polymer was obtained.

Example 2

[Catalyst preparation]

The catalyst slurry was prepared in the same manner as in [Catalyst preparation] in Example 1 except that 25 mg of B-1 was used as Component [B].

[Ethylene polymerization]

Polymerization was conducted in the same manner as in [Ethylene polymerization] in Example 1 except that the above catalyst slurry was used. Consequently, 12 g of ethylene polymer was obtained.

Example 3

[Catalyst preparation]

The catalyst slurry was prepared in the same manner as in [Catalyst preparation] in Example 1 except that 165 mg of B-2 was used as Component [B].

[Ethylene polymerization]

Polymerization was conducted in the same manner as in [Ethylene polymerization] in Example 1 except that the above catalyst slurry was used. Consequently, 16 g of ethylene polymer was obtained.

Example 4

[Catalyst preparation]

The catalyst slurry was prepared in the same manner as in [Catalyst preparation] in Example 1 except that 161 mg of B-3 was used as Component [B].

[Ethylene polymerization]

Polymerization was conducted in the same manner as in [Ethylene polymerization] in Example 1 except that the above catalyst slurry was used. Consequently, 18 g of ethylene polymer was obtained.

Example 5

[Catalyst preparation]

The catalyst slurry was prepared in the same manner as in [Catalyst preparation] in Example 1 except that 161 mg of B-4 was used as Component [B].

[Ethylene polymerization]

Polymerization was conducted in the same manner as in [Ethylene polymerization] in Example 1 except that the above catalyst solution was used. Consequently, 4.6 g of ethylene polymer was obtained.

Comparative Example 1

[Catalyst preparation]

In 100-mL glass vessel, 10 mL of toluene were placed. Thereto, were added 0.21 mL (0.3 mmol) of a triethylaluminum solution (1.44 M) in toluene, and 0.39 mg (1 µmol) of bis(indenyl)zirconium dichloride. The mixture was stirred for 15 hours to obtain a catalyst solution.

[Ethylene polymerization]

Polymerization was conducted in the same manner as in [Ethylene polymerization] in Example 1 except that the above catalyst solution was used. Consequently, 0.5 g of ethylene polymer was obtained.

Example 6

[Catalyst preparation]

The catalyst slurry was prepared in the same manner as in [catalyst preparation] in Example 1 except that 124 mg of B-5 was used as Component [B].

[Ethylene polymerization]

Polymerization was conducted in the same manner as in [Ethylene polymerization] in Example 1 except that the above catalyst slurry was used. Consequently, 115 g of ethylene polymer was obtained.

Example 7

[Catalyst preparation]

The catalyst slurry was prepared in the same manner as in [Catalyst preparation] in Example 1 except that 66 mg of B-5 was used as Component [B].

[Ethylene polymerization]

Polymerization was conducted in the same manner as in [Ethylene polymerization] in Example 1 except that the above catalyst slurry was used. Consequently, 36 g of ethylene polymer was obtained.

Example 8

[Catalyst preparation]

The catalyst slurry was prepared in the same manner as in [Catalyst preparation] in Example 1 except that 26 mg of B-5 was used as Component [B].

[Ethylene polymerization]

Polymerization was conducted in the same manner as in [Ethylene polymerization] in Example 1 except that the above catalyst slurry was used. Consequently, 27 g of ethylene polymer was obtained.

Example 9

[Catalyst preparation]

The catalyst slurry was prepared in the same manner as in [Catalyst preparation] in Example 1 except that 167 mg of B-6 was used as Component [B].

[Ethylene polymerization]

Polymerization was conducted in the same manner as in [Ethylene polymerization] in Example 1 except that the above catalyst slurry was used. Consequently, 100 g of ethylene polymer was obtained.

Example 10

[Catalyst preparation]

The catalyst slurry was prepared in the same manner as in [Catalyst preparation] in Example 1 except that 121 mg of B-6 was used as Component [B].

[Ethylene polymerization]

Polymerization was conducted in the same manner as in [Ethylene polymerization] in Example 1 except that the above catalyst slurry was used. Consequently, 91 g of ethylene polymer was obtained.

Example 11

[Catalyst preparation]

The catalyst slurry was prepared in the same manner as in [Catalyst preparation] in Example 1 except that 65 mg of B-6 was used as Component [B].

[Ethylene polymerization]

Polymerization was conducted in the same manner as in [Ethylene polymerization] in Example 1 except that the above catalyst slurry was used. Consequently, 32 g of ethylene polymer was obtained.

Example 12

[Catalyst preparation]

The catalyst slurry was prepared in the same manner as in [Catalyst preparation] in Example 1 except that 26 mg of B-6 was used as Component [B].

[Ethylene polymerization]

Polymerization was conducted in the same manner as in [Ethylene polymerization] in Example 1 except that the above catalyst slurry was used. Consequently, 23 g of ethylene polymer was obtained.

Example 13

[Catalyst preparation]

The catalyst slurry was prepared in the same manner as in [Catalyst preparation] in Example 1 except that 184 mg of B-7 was used as Component [B].

[Ethylene polymerization]

Polymerization was conducted in the same manner as in [Ethylene polymerization) in Example 1 except that the above catalyst slurry was used. Consequently, 82 g of ethylene polymer was obtained.

Example 14

[Catalyst preparation]

The catalyst slurry was prepared in the same manner as in [Catalyst preparation] in Example 1 except that 121 mg of B-7 was used as Component [B].

[Ethylene polymerization]

Polymerization was conducted in the same manner as in [Ethylene polymerization] in Example 1 except that the above catalyst slurry was used. Consequently, 46 g of ethylene polymer was obtained.

Example 15

[Catalyst preparation]

The catalyst slurry was prepared in the same manner as in [Catalyst preparation] in Example 1 except that 65 mg of B-7 was used as Component [B].

[Ethylene polymerization]

Polymerization was conducted in the same manner as in (Ethylene polymerization] in Example 1 except that the above catalyst slurry was used. Consequently, 37 g of ethylene polymer was obtained.

Example 16

[Catalyst preparation]

The catalyst slurry was prepared in the same manner as in [Catalyst preparation] in Example 1 except that 182 mg of B-8 was used as Component [B].

[Ethylene polymerization]

Polymerization was conducted in the same manner as in [Ethylene polymerization] in Example 1 except that the above catalyst slurry was used. Consequently, 121 g of ethylene polymer was obtained.

Example 17

[Catalyst preparation]

The catalyst slurry was prepared in the same manner as in [Catalyst preparation] in Example 1 except that 123 mg of B-8 was used as Component [B].

[Ethylene polymerization]

Polymerization was conducted in the same manner as in [Ethylene polymerization] in Example 1 except that the above catalyst slurry was used. Consequently, 71 g of ethylene polymer was obtained.

Example 18

[Catalyst preparation]

The catalyst slurry was prepared in the same manner as in [Catalyst preparation] in Example 1 except that 60 mg of B-8 was used as Component [B].

[Ethylene polymerization]

Polymerization was conducted in the same manner as in [Ethylene polymerization] in Example 1 except that the above catalyst slurry was used. Consequently, 48 g of ethylene polymer was obtained.

Example 19

[Catalyst preparation]

The catalyst slurry was prepared in the same manner as in [Catalyst preparation] in Example 1 except that 121 mg of B-9 was used as Component [B].

[Ethylene polymerization]

Polymerization was conducted in the same manner as in [Ethylene polymerization] in Example 1 except that the above catalyst slurry was used. Consequently, 147 g of ethylene polymer was obtained.

Example 20

[Catalyst preparation]

The catalyst slurry was prepared in the same manner as in [Catalyst preparation] in Example 1 except that 62 mg of B-9 was used as Component [B].

[Ethylene polymerization]

Polymerization was conducted in the same manner as in [Ethylene polymerization] in Example 1 except that the above catalyst slurry was used. Consequently, 84 g of ethylene polymer was obtained.

Example 21

[Catalyst preparation]

The catalyst slurry was prepared in the same manner as in [Catalyst preparation] in Example 1 except that 121 mg of B-10 was used as Component [B].

[Ethylene polymerization]

Polymerization was conducted in the same manner as in [Ethylene polymerization] in Example 1 except that the above catalyst slurry was used. Consequently, 70 g of ethylene polymer was obtained.

Example 22

[Catalyst preparation]

The catalyst slurry was prepared in the same manner as in [Catalyst preparation] in Example 1 except that 62 mg of B-10 was used as Component [B].

[Ethylene polymerization]

Polymerization was conducted in the same manner as in [Ethylene polymerization] in Example 1 except that the above catalyst slurry was used. Consequently, 51 g of ethylene polymer was obtained.

Example 23

[Catalyst preparation]

The catalyst slurry was prepared in the same manner as in [Catalyst preparation] in Example 1 except that 166 mg of B-11 was used as Component [B].

[Ethylene polymerization]

Polymerization was conducted in the same manner as in [Ethylene polymerization] in Example 1 except that the above catalyst slurry was used. Consequently, 177 g of ethylene polymer was obtained.

Example 24

[Catalyst preparation]

The catalyst slurry was prepared in the same manner as in [Catalyst preparation] in Example 1 except that 123 mg of B-11 was used as Component [B].

[Ethylene polymerization]

Polymerization was conducted in the same manner as in [Ethylene polymerization] in Example 1 except that the above catalyst slurry was used. Consequently, 137 g of ethylene polymer was obtained.

Example 25

[Catalyst preparation]

The catalyst slurry was prepared in the same manner as in [Catalyst preparation] in Example 1 except that 60 mg of B-11 was used as Component [B].

[Ethylene polymerization]

Polymerization was conducted in the same manner as in [Ethylene polymerization] in Example 1 except that the above catalyst slurry was used. Consequently, 54 g of ethylene polymer was obtained.

Example 26

[Catalyst preparation]

The catalyst slurry was prepared in the same manner as in [Catalyst preparation] in Example 1 except that 68 mg of B-12 was used as Component [B].

[Ethylene polymerization]

Polymerization was conducted in the same manner as in [Ethylene polymerization] in Example 1 except that the above catalyst slurry was used. Consequently, 52 g of ethylene polymer was obtained.

Example 27

[Catalyst preparation]

The catalyst slurry was prepared in the same manner as in [Catalyst preparation] in Example 1 except that 39 mg of B-12 was used as Component [B].

[Ethylene polymerization]

Polymerization was conducted in the same manner as in [Ethylene polymerization] in Example 1 except that the above catalyst slurry was used. Consequently, 40 g of ethylene polymer was obtained.

Example 28

[Catalyst preparation]

The catalyst slurry was prepared in the same manner as in [Catalyst preparation] in Example 1 except that 101 mg of B-13 was used as Component [B].

[Ethylene polymerization]

Polymerization was conducted in the same manner as in [Ethylene polymerization] in Ex-ample 1 except that the above catalyst slurry was used. Consequently, 56 g of ethylene polymer was obtained.

Example 29

[Catalyst preparation]

The catalyst slurry was prepared in the same manner as in [Catalyst preparation] in Example 1 except that 68 mg of B-13 was used as Component [B].

[Ethylene polymerization]

Polymerization was conducted in the same manner as in [Ethylene polymerization] in Example 1 except that the above catalyst slurry was used. Consequently, 55 g of ethylene polymer was obtained.

Example 30

[Catalyst preparation]

The catalyst slurry was prepared in the same manner as in [Catalyst preparation] in Example 1 except that 38 mg of B-13 was used as Component [B].

[Ethylene polymerization]

Polymerization was conducted in the same manner as in [Ethylene polymerization] in Example 1 except that the above catalyst slurry was used. Consequently, 42 g of ethylene polymer was obtained.

Example 31

[Catalyst preparation]

The catalyst slurry was prepared in the same manner as in [Catalyst preparation] in Example 1 except that 360 mg of B-16 was used as Component [B].

[Ethylene polymerization]

Polymerization was conducted in the same manner as in [Ethylene polymerization] in Example 1 except that the above catalyst slurry was used. Consequently, 120 g of ethylene polymer was obtained.

Example 32

[Catalyst preparation]

The catalyst slurry was prepared in the same manner as in [Catalyst preparation] in Example 1 except that 239 mg of B-16 was used as Component [B].

[Ethylene polymerization]

Polymerization was conducted in the same manner as in [Ethylene polymerization] in Example 1 except that the above catalyst slurry was used. Consequently, 62 g of ethylene polymer was obtained.

Example 33

[Catalyst preparation]

The catalyst slurry was prepared in the same manner as in [Catalyst preparation] in Example 1 except that 368 mg of B-17 was used as Component [B].

[Ethylene polymerization]

Polymerization was conducted in the same manner as in [Ethylene polymerization] in Example 1 except that the above catalyst slurry was used. Consequently, 76 g of ethylene polymer was obtained.

Example 34

[Catalyst preparation]

The catalyst slurry was prepared in the same manner as in [Catalyst preparation] in Example 1 except that 242 mg of B-17 was used as Component [B].

[Ethylene polymerization]

Polymerization was conducted in the same manner as in [Ethylene polymerization] in Example 1 except that the above catalyst slurry was used. Consequently, 67 g of ethylene polymer was obtained.

Example 35

[Catalyst preparation]

The catalyst slurry was prepared in the same manner as in [Catalyst preparation] in Example 1 except that 122 mg of B-17 was used as Component [B].

[Ethylene polymerization]

Polymerization was conducted in the same manner as in [Ethylene polymerization] in Example 1 except that the above catalyst slurry was used. Consequently, 26 g of ethylene polymer was obtained.

Example 36

[Catalyst preparation]

The catalyst slurry was prepared in the same manner as in [Catalyst preparation] in Example 1 except that 357 mg of B-18 was used as Component [B].

[Ethylene polymerization]

Polymerization was conducted in the same manner as in [Ethylene polymerization] in Example 1 except that the above catalyst slurry was used. Consequently, 81 g of ethylene polymer was obtained.

Example 37

[Catalyst preparation]

The catalyst slurry was prepared in the same manner as in [Catalyst preparation] in Example 1 except that 239 mg of B-19 was used as Component [B].

[Ethylene polymerization]

Polymerization was conducted in the same manner as in [Ethylene polymerization] in Example 1 except that the above catalyst slurry was used. Consequently, 45 g of ethylene polymer was obtained.

Example 38

[Catalyst preparation]

The catalyst slurry was prepared in the same manner as in [Catalyst preparation] in Example 1 except that 240 mg of B-20 was used as Component [B].

[Ethylene polymerization]

Polymerization was conducted in the same manner as in [Ethylene polymerization] in Example 1 except that the above catalyst slurry was used. Consequently, 17 g of ethylene polymer was obtained.

Example 39

[Catalyst preparation]

The catalyst slurry was prepared in the same manner as in [Catalyst preparation] in Example 1 except that 236 mg of B-21 was used as Component [B].

[Ethylene polymerization]

Polymerization was conducted in the same manner as in [Ethylene polymerization] in Example 1 except that the above catalyst slurry was used. Consequently, 9 g of ethylene polymer was obtained

Example 40

[Catalyst preparation]

The catalyst slurry was prepared in the same manner as in [Catalyst preparation] in Example 1 except that 483 mg of B-22 was used as Component [B].

[Ethylene polymerization]

Polymerization was conducted in the same manner as in [Ethylene polymerization] in Example 1 except that the above catalyst slurry was used. Consequently, 182 g of ethylene polymer was obtained.

Example 41

[Catalyst preparation]

The catalyst slurry was prepared in the same manner as in [Catalyst preparation] in Example 1 except that 237 mg of B-22 was used as Component [B].

[Ethylene polymerization]

Polymerization was conducted in the same manner as in [Ethylene polymerization] in Example 1 except that the above catalyst slurry was used. Consequently, 71 g of ethylene polymer was obtained.

Example 42

[Catalyst preparation]

The catalyst slurry was prepared in the same manner as in [Catalyst preparation] in Example 1 except that 120 mg of B-23 was used as Component [B].

[Ethylene polymerization]

Polymerization was conducted in the same manner as in [Ethylene polymerization] in Example 1 except that the above catalyst slurry was used. Consequently, 43 g of ethylene polymer was obtained.

Example 43

[Catalyst preparation]

The catalyst slurry was prepared in the same manner as in [Catalyst preparation] in Example 1 except that 130 mg of B-24 was used as Component [B].

[Ethylene polymerization]

Polymerization was conducted in the same manner as in [Ethylene polymerization] in Example 1 except that the above catalyst slurry was used. Consequently, 42 g of ethylene polymer was obtained.

Example 44

[Catalyst preparation]

The catalyst slurry was prepared in the same manner as in [Catalyst preparation] in Example 1 except that 25 mg of B-24 was used as Component [B].

[Ethylene polymerization]

Polymerization was conducted in the same manner as in [Ethylene polymerization] in Example 1 except that the above catalyst slurry was used. Consequently, 26 g of ethylene polymer was obtained.

Example 45

[Catalyst preparation]

The catalyst slurry was prepared in the same manner as in [Catalyst preparation] in Example 1 except that 5 mg of B-24 was used as Component [B].

[Ethylene polymerization]

Polymerization was conducted in the same manner as in [Ethylene polymerization] in Example 1 except that the above catalyst slurry was used. Consequently, 3 g of ethylene polymer was obtained.

Example 46

[Catalyst preparation]

The catalyst slurry was prepared in the same manner as in [Catalyst preparation] in Example 1 except that 163 mg of B-25 was used as Component [B].

[Ethylene polymerization]

Polymerization was conducted in the same manner as in [Ethylene polymerization] in Example 1 except that the above catalyst slurry was used. Consequently, 60 g of ethylene polymer was obtained.

Example 47

[Catalyst preparation]

The catalyst slurry was prepared in the same manner as in [Catalyst preparation] in Example 1 except that 127 mg of B-25 was used as Component [B].

[Ethylene polymerization]

Polymerization was conducted in the same manner as in [Ethylene polymerization] in Example 1 except that the above catalyst slurry was used. Consequently, 52 g of ethylene polymer was obtained.

Example 48

[Catalyst preparation]

The catalyst slurry was prepared in the same manner as in [Catalyst preparation] in Example 1 except that 163 mg of B-26 was used as Component [B].

[Ethylene polymerization]

Polymerization was conducted in the same manner as in [Ethylene polymerization] in Example 1 except that the above catalyst slurry was used. Consequently, 13 g of ethylene polymer was obtained.

Example 49

[Catalyst preparation]

The catalyst slurry was prepared in the same manner as in [Catalyst preparation] in Example 1 except that 129 mg of B-26 was used as Component [B].

[Ethylene polymerization]

Polymerization was conducted in the same manner as in [Ethylene polymerization] in Example 1 except that the above catalyst slurry was used. Consequently, 8 g of ethylene polymer was obtained.

Example 50

[Catalyst preparation]

The catalyst slurry was prepared in the same manner as in [Catalyst preparation] in Example 1 except that 181 mg of B-27 was used as Component [B].

[Ethylene polymerization]

Polymerization was conducted in the same manner as in [Ethylene polymerization] in Example 1 except that the above catalyst slurry was used. Consequently, 1 g of ethylene polymer was obtained.

Example 51

[Catalyst preparation]

The catalyst slurry was prepared in the same manner as in [Catalyst preparation] in Example 1 except that 25 mg of B-28 was used as Component [B].

[Ethylene polymerization]

Polymerization was conducted in the same manner as in [Ethylene polymerization] in Example 1 except that the above catalyst slurry was used. Consequently, 7 g of ethylene polymer was obtained.

Example 52

[Catalyst preparation]

The catalyst slurry was prepared in the same manner as in [Catalyst preparation] in Example 1 except that 25 mg of B-29 was used as Component [B].

[Ethylene polymerization]

Polymerization was conducted in the same manner as in [Ethylene polymerization] in Example 1 except that the above catalyst slurry was used. Consequently, 6 g of ethylene polymer was obtained.

Example 53

[Catalyst preparation]

The catalyst slurry was prepared in the same manner as in [Catalyst preparation] in Example 1 except that 27 mg of B-30 was used as Component [B].

[Ethylene polymerization]

Polymerization was conducted in the same manner as in [Ethylene polymerization] in Example 1 except that the above catalyst slurry was used. Consequently, 4 g of ethylene polymer was obtained.

Example 54

[Catalyst preparation]

The catalyst slurry was prepared in the same manner as in [Catalyst preparation) in Example 1 except that 183 mg of B-31 was used as Component [B].

[Ethylene polymerization]

Polymerization was conducted in the same manner as in [Ethylene polymerization] in Example 1 except that the above catalyst slurry was used. Consequently, 6 g of ethylene polymer was obtained.

Example 55

[Catalyst preparation]

The catalyst slurry was prepared in the same manner as in [Catalyst preparation] in Example 1 except that 125 mg of B-32 was used as Component [B].

[Ethylene polymerization]

Polymerization was conducted in the same manner as in [Ethylene polymerization] in Example 1 except that the above catalyst slurry was used. Consequently, 7 g of ethylene polymer was obtained.

Example 56

[Catalyst preparation]

The catalyst slurry was prepared in the same manner as in [Catalyst preparation] in Example 1 except that 125 mg of B-33 was used as Component [B].

[Ethylene polymerization]

Polymerization was conducted in the same manner as in [Ethylene polymerization] in Example 1 except that the above catalyst slurry was used. Consequently, 1 g of ethylene polymer was obtained.

Example 57

[Catalyst preparation]

The catalyst slurry was prepared in the same manner as in [Catalyst preparation] in Example 1 except that 125 mg of B-34 was used as Component [B].

[Ethylene polymerization]

Polymerization was conducted in the same manner as in [Ethylene polymerization] in Example 1 except that the above catalyst slurry was used. Consequently, 2 g of ethylene polymer was obtained.

Example 58

[Catalyst preparation]

The catalyst slurry was prepared in the same manner as in [Catalyst preparation] in Example 1 except that 125 mg of B-35 was used as Component [B].

[Ethylene polymerization]

Polymerization was conducted in the same manner as in [Ethylene polymerization] in Example 1 except that the above catalyst slurry was used. Consequently, 1 g of ethylene polymer was obtained.

Example 59

[Catalyst preparation]

The catalyst slurry was prepared in the same manner as in [Catalyst preparation] in Example 1 except that 125 mg of B-36 was used as Component [B].

[Ethylene polymerization]

Polymerization was conducted in the same manner as in [Ethylene polymerization] in Example 1 except that the above catalyst slurry was used. Consequently, 1 g of ethylene polymer was obtained.

Example 60

[Catalyst preparation]

The catalyst slurry was prepared in the same manner as in [Catalyst preparation] in Example 1 except that 0.35 mg (1 $\mu$mol) of bis(1,3-dimethylcyclopentadienyl)-zirconium dichloride was used as Component [A], and 121 mg of B-5 was used as Component [B].

[Ethylene polymerization]

Polymerization was conducted in the same manner as in [Ethylene polymerization] in Example 1 except that the above catalyst slurry was used. Consequently, 46 g of ethylene polymer was obtained.

Example 61

[Catalyst preparation]

The catalyst slurry was prepared in the same manner as in [Catalyst preparation] in Example 1 except that 0.42 mg (1 $\mu$mol) of ethylenebis(indenyl)zirconium dichloride was used as Component [A], and 124 mg of B-5 was used as Component [B].

[Ethylene polymerization]

Polymerization was conducted in the same manner as in [Ethylene polymerization] in Example 1 except that the above catalyst slurry was used. Consequently, 59 g of ethylene polymer was obtained.

Example 62

[Catalyst preparation]

The catalyst slurry was prepared in the same manner as in [Catalyst preparation] in Example 1 except that 121 mg of B-5 was used as Component [B].

[Ethylene polymerization]

Polymerization was conducted in the same manner as in [Ethylene polymerization] in Example 1 except that the above catalyst slurry was used, and the ethylene partial pressure was changed to 6 kgf/cm$^2$. Consequently, 28 g of ethylene polymer was obtained.

Example 63

[Catalyst preparation]

The catalyst slurry was prepared in the same manner as in [Catalyst preparation] in Example 1 except that 124 mg of B-5 was used as Component [B], and 0.56 mL (0.8 mmol) of a triethylaluminum solution (1.44 M) in toluene was used as Component [C].

[Ethylene polymerization]

Polymerization was conducted in the same manner as in [Ethylene polymerization] in Example 1 except that the above catalyst slurry was used, and the ethylene partial pressure was changed to 6 kgf/cm$^2$. Consequently, 13 g of ethylene polymer was obtained.

Example 64

[Catalyst preparation]

The catalyst slurry was prepared in the same manner as in [Catalyst preparation] in Example 1 except that 120 mg of B-5 was used as Component [B], and 1.25 mL (1.8 mmol) of a triethylaluminum solution (1.44 M) in toluene was used as Component [C].

[Ethylene polymerization]

Polymerization was conducted in the same manner as in [Ethylene polymerization] in Example 1 except that the above catalyst slurry was used, and the ethylene partial pressure was changed to 6 kgf/cm$^2$. Consequently, 8 g of ethylene polymer was obtained.

Example 65

[Catalyst preparation]

The catalyst slurry was prepared in the same manner as in [Catalyst preparation] in Example 1 except that 1.18 mg (3

μmol) of bis(indenyl)zirconium dichloride was used as Component [A], and 363 mg of B-6 was used as Component [B].

[Ethylene polymerization]

Polymerization was conducted in the same manner as in [Ethylene polymerization] in Example 1 except that the above catalyst slurry was used, and the ethylene partial pressure was changed to 6 kgf/cm$^2$. Consequently, 102 g of ethylene polymer was obtained.

Example 66

[Catalyst preparation]

The catalyst slurry was prepared in the same manner as in [Catalyst preparation] in Example 1 except that 130 mg of B-6 was used as Component [B].

[Ethylene polymerization]

Polymerization was conducted in the same manner as in [Ethylene polymerization] in Example 1 except that the above catalyst slurry was used, and the ethylene partial pressure was changed to 6 kgf/cm$^2$. Consequently, 25 g of ethylene polymer was obtained.

Example 67

[Catalyst preparation]

The catalyst slurry was prepared in the same manner as in [Catalyst preparation] in Example 1 except that 121 mg of B-6 was used as Component [B], and 0.35 mL (0.3 mmol) of a triisobutylaluminum solution (0.848 M) in toluene was used as Component [C].

[Ethylene polymerization]

Polymerization was conducted in the same manner as in [Ethylene polymerization] in Example 1 except that the above catalyst slurry was used, 0.24 mL (0.2 mmol) of a triisobutylaluminum solution (0.848 M) in toluene was used as Component [C], and the ethylene partial pressure was changed to 6 kgf/cm$^2$. Consequently, 19 g of ethylene polymer was obtained.

Example 68

[Catalyst preparation]

The catalyst slurry was prepared in the same manner as in [Catalyst preparation] in Example 1 except that 120 mg of B-5 was used as Component [B], and 0.13 mL (0.3 mmol) of a trimethylaluminum solution (2.4 M) in toluene was used as Component [C].

[Ethylene polymerization]

Polymerization was conducted in the same manner as in [Ethylene polymerization] in Example 1 except that the above catalyst slurry was used, 0.08 mL (0.2 mmol) of a trimethylaluminum solution (2.4 M) in toluene was used as Component [C], and the ethylene partial pressure was changed to 6 kgf/cm$^2$. Consequently, 5 g of ethylene polymer was obtained.

Example 69

[Catalyst preparation]

The catalyst slurry was prepared in the same manner as in [Catalyst preparation] in Example 1 except that 124 mg of B-5 was used as Component [B], and 0.75 mL (1.8 mmol) of a trimethylaluminum solution (2.4 M in toluene was used as Component [C].

[Ethylene polymerization]

Polymerization was conducted in the same manner as in [Ethylene polymerization] in Example 1 except that the above catalyst slurry was used, 0.08 mL (0.2 mmol) of a trimethylaluminum solution (2.4 M) in toluene was used as Component [C], and the ethylene partial pressure was changed to 6 kgf/cm$^2$. Consequently, 4 g of ethylene polymer was obtained.

Example 70

[Catalyst preparation]

The catalyst slurry was prepared in the same manner as in [Catalyst preparation] in Example 1 except that 170 mg of B-6 was used as Component [B].

[Ethylene polymerization]

In a 2-liter autoclave, were placed 1200 mL of n-hexane and 0.14 mL (0.2 mmol) of a triethylaluminum solution (1.44 M) in toluene. The mixture was stirred at room temperature for 5 minutes. The entire of the above catalyst slurry was put into this autoclave. The inside temperature of the autoclave was raised to 75° C. with stirring. Then ethylene was introduced to a partial pressure of 6 kgf/cm$^2$ to start polymerization. During the polymerization, ethylene was introduced continuously to keep the ethylene partial pressure at 6 kgf/cm$^2$, and the polymerization temperature was controlled to be at 80° C. After 90 minutes of polymerization, 3 mL of ethyl alcohol was introduced into the autoclave to decompose the catalyst to stop the polymerization. The autoclave was degassed to the internal pressure of 0 kgf/cm$^2$. The formed ethylene polymer was collected by filtration, and was dried at room temperature for one day. Thereby, 66 g of ethylene polymer was obtained.

Example 71

[Catalyst preparation]

The catalyst slurry was prepared in the same manner as in [Catalyst preparation] in Example 1 except that 129 mg of B-6 was used as Component [B].

[Ethylene polymerization]

Polymerization was conducted in the same manner as in [Ethylene polymerization] in Example 70 except that the above catalyst slurry was used. Consequently, 41 g of ethylene polymer was obtained.

Example 72

[Catalyst preparation]

The catalyst slurry was prepared in the same manner as in [Catalyst preparation] in Example 1 except that 132 mg of B-6 was used as Component [B].

[Ethylene polymerization]

Polymerization was conducted in the same manner as in [Ethylene polymerization] in Example 70 except that the above catalyst slurry was used, and the ethylene partial pressure was changed to 20 kgf/cm$^2$. Consequently, 221 g of ethylene polymer was obtained.

Example 73

[Catalyst preparation]

The catalyst slurry was prepared in the same manner as in [Catalyst preparation] in Example 1 except that 66 mg of B-6 was used as Component [B].

[Ethylene polymerization]

Polymerization was conducted in the same manner as in [Ethylene polymerization] in Example 70 except that the above catalyst slurry was used, and the ethylene partial pressure was changed to 20 kgf/cm$^2$. Consequently, 165 g of ethylene polymer was obtained.

Example 74

[Catalyst preparation]

The catalyst slurry was prepared in the same manner as in (Catalyst preparation] in Example 1 except that 65 mg of B-14 was used as Component [B].

[Ethylene polymerization]

Polymerization was conducted in the same manner as in [Ethylene polymerization] in Example 70 except that the above catalyst slurry was used, and the ethylene partial pressure was changed to 20 kgf/cm$^2$. Consequently, 92 g of ethylene polymer was obtained.

Example 75

[Catalyst preparation]

The catalyst slurry was prepared in the same manner as in [Catalyst preparation] in Example 1 except that 31 mg of B-14 was used as Component [B].

[Ethylene polymerization]

Polymerization was conducted in the same manner as in [Ethylene polymerization] in Example 70 except that the above catalyst slurry was used, and the ethylene partial pressure was changed to 20 kgf/cm$^2$. Consequently, 74 g of ethylene polymer was obtained.

Example 76

[Catalyst preparation]

The catalyst slurry was prepared in the same manner as in [Catalyst preparation] in Example 1 except that 61 mg of B-15 was used as Component [B].

[Ethylene polymerization]

Polymerization was conducted in the same manner as in [Ethylene polymerization] in Example 70 except that the above catalyst slurry was used, and the ethylene partial pressure was changed to 20 kgf/cm$^2$ Consequently, 38 g of ethylene polymer was obtained.

Example 77

[Catalyst preparation]

The catalyst slurry was prepared in the same manner as in [Catalyst preparation] in Example 1 except that 30 mg of B-15 was used as Component [B].

[Ethylene polymerization]

Polymerization was conducted in the same manner as in [Ethylene polymerization] in Example 70 except that the above catalyst slurry was used, and the ethylene partial pressure was changed to 20 kgf/cm$^2$. Consequently, 53 g of ethylene polymer was obtained.

Example 78

[Catalyst preparation]

The catalyst slurry was prepared in the same manner as in [Catalyst preparation] in Example 1 except that 1.18 mg (3 μmol) of bis(indenyl)zirconium dichloride was used as Component [A], and 364 mg of B-6 was used as Component [B].

[Copolymerization of ethylene and 1-hexene]

In a 2-liter autoclave, were placed 1200 mL of n-hexane, 20 mL of 1-hexene, and 0.14 mL (0.2 mmol) of a triethylaluminum solution (1.44 M) in toluene. The content in the autoclave was stirred at room temperature for 5 minutes. The entire of the above catalyst slurry was put into the autoclave. The inside temperature of the autoclave was raised to 75° C. with stirring. Then ethylene was introduced into the autoclave to a partial pressure of 6 kgf/cm$^2$ to start polymerization. During the polymerization, ethylene was introduced continuously to keep the partial pressure at 6 kgf/cm$^2$, and the polymerization temperature was controlled to be at 80° C. After 90 minutes of polymerization, 3 mL of ethyl alcohol was introduced into the autoclave to decompose the catalyst to stop the polymerization. The autoclave was degassed to the internal pressure of 0 kgf/cm$^2$. The formed ethylene/1-hexene copolymer was collected by filtration, and was dried at 80° C. in vacuo for one day. Thereby, 24 g of ethylene/1-hexene copolymer was obtained. The obtained copolymer had properties of $M_w$: 10.7×10$^4$, $M_n$: 4.59×10$^4$, $M_w/M_n$: 2.33, and $T_m$: 129° C.

Example 79

[Catalyst preparation]

The catalyst slurry was prepared in the same manner as in [Catalyst preparation] in Example 1 except that 0.56 mg (1 μmol) of diphenylmethylene(cyclopentadienyl)(fluorenyl) zirconium dichloride was used as Component [A], and 120 mg of B-6 was used as Component [B].

[Copolymerization of ethylene and 1-hexene]

In a 1-liter autoclave, were placed 600 mL of an aliphatic hydrocarbon (trade name: IP Solvent 1620, produced by Idemitsu Sekiyu Kagaku K.K.), and 20 mL of 1-hexene. The temperature of the autoclave was set at 170° C. Into the autoclave, ethylene was fed at a pressure of 20 kgf/cm$^2$. Thereto, the entire of the above catalyst slurry was introduced, and the autoclave was stirred at 170° C. at 1500 rpm for 10 minutes. Thereby 11 g of ethylene/1-hexene copolymer was produced.

Example 80

[Catalyst preparation]

The catalyst slurry was prepared in the same manner as in [Catalyst preparation] in Example 1 except that 0.56 mg (1 μmol) of diphenylmethylene(cyclopentadienyl)(fluorenyl) zirconium dichloride was used as Component [A], and 62 mg of B-14 was used as Component [B].

[Copolymerization of ethylene and 1-hexene]

Polymerization was conducted in the same manner as in [Copolymerization of ethylene and 1-hexene] in Example 79 except that the above catalyst slurry was used. Consequently, 4 g of ethylene/1-hexene copolymer was obtained.

Example 81

[Catalyst preparation]

The catalyst slurry was prepared in the same manner as in [Catalyst preparation] in Example 1 except that 0.56 mg (1 μmol) of diphenylmethylene(cyclopentadienyl)(fluorenyl) zirconium dichloride was used as Component [A], and 59 mg of B-15 was used as Component [B].

[Copolymerization of ethylene and 1-hexene]

Polymerization was conducted in the same manner as in [Copolymerization of ethylene and 1-hexene] in Example 79 except that the above catalyst slurry was used. Consequently, 3 g of ethylene/1-hexene copolymer was obtained.

Example 82

[Catalyst preparation]

The catalyst slurry was prepared in the same manner as in [Catalyst preparation] in Example 1 except that 0.67 mg (1

μmol) of diphenylmethylene(cyclopentadienyl)(2,7-di-t-butylfluorenyl)zirconium dichloride was used as Component [A], and 179 mg of B-6 was used as Component [B].

[Copolymerization of ethylene and 1-hexene]

Polymerization was conducted in the same manner as in [Copolymerization of ethylene and 1-hexene] in Example 79 except that the above catalyst slurry was used. Consequently, 15 g of ethylene/1-hexene copolymer was obtained. Tables 5–10 show the polymerization conditions and the polymerization results of the above Examples and Comparative Example.

Example 83

[Catalyst preparation]

The catalyst slurry was prepared in the same manner as in [Catalyst preparation] in Example 1 except that 3.34 mg (5 μmol) of diphenylmethylene(cyclopentadienyl)(2,7-di-t-butylfluorenyl)zirconium dichloride was used as Component [A], 903 mg of B-6 was used as Component [B], and 1.04 mL (1.50 mmol) of a triethylaluminum solution (1.44 M) in toluene was used as Component [C].

[Copolymerization of ethylene and 1-hexene]

Polymerization was conducted in the same manner as in [Copolymerization of ethylene and 1-hexene] in Example 79 except that the above catalyst slurry was used. Consequently, 40 g of ethylene/1-hexene copolymer was obtained. The obtained copolymer had properties of $M_w$: $9.24 \times 10^4$, $M_n$: $4.47 \times 10^4$, $M_w/M_n$: 2.07, and $T_m$: 118° C. Table 5–10 show the polymerization conditions and the polymerization results of the above Examples and Comparative Example.

Example 84

[Catalyst preparation]

The catalyst slurry was prepared in the same manner as in [Catalyst preparation] in Example 1 except that 2.09 mg (5 μmol) of ethylenebis(indenyl)zirconium dichloride as Component [A], 310 mg of B-6 as Component [B], and 0.28 mL (0.4 mmol) of a triethylaluminum solution (1.44 M) in toluene as Component [C] were used.

[Propylene polymerization]

In a 2-liter autoclave, were placed 500 mL of toluene and 0.14 mL (0.2 mmol) of a triethylaluminum solution (1.44 M) in toluene. The content in the autoclave was stirred at room temperature for 5 minutes. The entire of the above catalyst slurry was put into this autoclave. The inside temperature of the autoclave was raised to 35° C. with stirring. Then 500 mL of propylene was introduced thereto to start polymerization. During the polymerization, the polymerization temperature was controlled to be at 40° C. After 60 minutes of polymerization, 3 mL of ethyl alcohol was introduced into the autoclave to decompose the catalyst to stop the polymerization. The autoclave was degassed to the internal pressure of 0 kgf/cm². The formed propylene polymer was collected by filtration, and was dried at 80° C. in vacuo for one day. Thereby, 60 g of an isotactic propylene polymer was obtained. The obtained isotactic propylene polymer had properties of $M_w$: $3.94 \times 10^4$, $M_n$: $1.88 \times 10^4$, $M_w/M_n$: 2.09, and $T_m$: 138° C.

Preparation of Components [B] employed in Examples 85–93:

XXXVII. Preparation of B-37

[Reduction of molybdenum disulfide]

To 7.2 g (45 mmol) of molybdenum disulfide, was added 100 mL of n-hexane. Thereto, 24 mL (37 mmol) of an n-butyllithium (1.54 M) in n-hexane was added dropwise. The suspension was stirred at room temperature for 24 hours. Thereafter the supernatant was removed. The solid matter was washed with n-hexane, and was dried at room temperature at $10^{-3}$ Torr, and then at 75–85° C. at $10^{-3}$ Torr to obtain a black solid matter. The obtained reduction product had composition of $(Li^+)_{0.80}[MoS_2]^{0.80-}$ according to elmental analysis.

[Lewis base treatment]

To 6 g of the above reduction product, was added 100 mL of aqueous 25% ammonia solution. This suspension was stirred at –30° C. for 2 hours. The supernatant was removed. The solid matter was washed with water.

[Salt treatment]

In 200 mL of water, was dissolved 7.1 g (45 mmol) of dimethylaniline hydrochloride. To this aqueous solution, 6 g of the above Lewis base treatment product was added. This suspension was stirred at room temperature for 24 hours. Then the supernatant was removed. The solid matter was washed with water and ethyl alcohol, and was dried at room temperature at $10^{-3}$ Torr for 24 hours to obtain B-37. The obtained product had composition of $[Ph(Me)_2NH^+]_{0.16}[MoS_2]^{0.16-}$ according to elemental analysis.

XXXVIII. Preparation of B-38

[Reduction of molybdenum disulfide]

To 7.0 g (44 mmol) of molybdenum disulfide, was added 100 mL of n-hexane. Thereto, 57 mL (88 mmol) of an n-butyllithium (1.54 M) in n-hexane was added dropwise. The suspension was stirred at room temperature for three days. Thereafter the supernatant was removed. The solid matter was washed with n-hexane, and was dried at room temperature at $10^{-3}$ Torr, and then at 75–85° C. at $10^{-3}$ Torr to obtain a black solid matter. The obtained reduction product had composition of $(Li^+)_{1.20}[MoS_2]^{1.20-}$ according to elemental analysis.

[Lewis base treatment]

To 6 g of the above reduction product, was added 100 mL of aqueous 25% ammonia solution. This suspension was stirred at –30° C. for 2 hours. The supernatant was removed. The solid matter was washed with water.

[Salt treatment]

In 200 mL of water, was dissolved 7.1 g (45 mmol) of dimethylaniline hydrochloride. To this aqueous solution, 6 g of the above Lewis base treatment product was added. This suspension was stirred at room temperature for 24 hours. Then the supernatant was removed. The solid matter was washed with water and ethyl alcohol, and was dried at room temperature at $10^{-3}$ Torr for 24 hours to obtain B-38.

The obtained product had composition of $[Ph(Me)_2NH^+]_{0.21}[MoS_2]^{0.21-}$ according to elemental analysis.

Example 85

[Catalyst component preparations]

In a 100 mL-glass vessel, were placed 123 mg of B-37, and 10 mL of toluene. Thereto, were added 0.21 mL (0.3 mmol) of a triethylaluminum solution (1.44 M)-in toluene, and 0.39 mg (1 μmol) of bis(indenyl)zirconium dichloride.

The mixture was stirred for 15 hours to obtain a catalyst component slurry.

[Ethylene polymerization]

In a 2-liter autoclave, were placed 500 mL of toluene, and 0.14 mL (0.2 mmol) of an n-butylethylmagnesium solution (1.47 M) in heptane. The inside temperature of the autoclave was raised to 75° C. Then ethylene was introduced to a partial pressure of 6 kgf/cm². The mixture was stirred at 75° C. for 30 minutes. The entire of the above catalyst component slurry was put into this autoclave to start polymerization. During the polymerization, ethylene was introduced continuously to keep the ethylene partial pressure at 6 kgf/cm², and the polymerization temperature was controlled to be at 80° C. After 60 minutes of polymerization, 3 mL of ethyl alcohol was introduced into the autoclave to decompose the catalyst to stop the polymerization. The autoclave was degassed to the internal pressure of 0 kgf/cm². The formed ethylene polymer was collected by filtration, and was dried at 80° C. in vacuo for one day. Thereby, 41 g of ethylene polymer was obtained.

Example 86

[Ethylene/1-hexene copolymerization]

In a 2-liter autoclave, were placed 500 mL of toluene, 20 mL of 1-hexene, and 0.14 mL (0.2 mmol) of an n-butylethylmagnesium solution (1.47 M) in heptane. The inside temperature of the autoclave was raised to 75° C. Then etylene was introduced to a partial pressure of 6 kgf/cm². The mixture was stirred at 75° C. for 30 minutes.

Into this autoclave, was put the entire of the catalyst component slurry prepared in the same manner as in [Catalyst component preparation] in Example 85 to start polymerization. During the polymerization, ethylene was introduced continuously to keep the ethylene partial pressure at 6 kgf/cm², and the polymerization temperature was controlled to be at 80° C. After 60 minutes of polymerization, 3 mL of ethyl alcohol was introduced into the autoclave to decompose the catalyst to stop the polymerization. The autoclave was degassed to the internal pressure of 0 kgf/cm². The formed ethylene/1-hexene copolymer was collected by filtration, and was dried at 80° C. in vacuo for one day. Thereby, 35 g of ethylene/1-hexene copolymer was obtained.

Example 87

[Catalyst component preparation]

In a 100 mL-glass vessel, were placed 371 mg of B-38, and 10 mL of toluene. Thereto, were added 0.21 mL (0.3 mmol) of a triethylaluminum solution (1.44 M) in toluene, and 1.18 mg (3 μmol) of bis(indenyl)zirconium dichloride. The mixture was stirred for 15 hours to obtain a catalyst component slurry.

[Ethylene polymerization]

In a 2-liter autoclave, were placed 500 mL of toluene, and 0.14 mL (0.2 mmol) of an n-butylethylmagnesium solution (1.47 M) in heptane. The inside temperature of the autoclave was raised to 75° C. Then ethylene was introduced to a partial pressure of 6 kgf/cm². The mixture was stirred at 75° C. for 30 minutes. The entire of the above catalyst component slurry was put into this autoclave to start polymerization. During the polymerization ethylene was introduced continuously to keep the ethylene partial pressure at 6 kgf/cm², and the polymerization temperature was controlled to be at 80° C. After 60 minutes of polymerization, 3 mL of ethyl alcohol was introduced into the autoclave to decompose the catalyst to stop the polymerization. The autoclave was degassed to the internal pressure of 0 kgf/cm². The formed ethylene polymer was collected by filtration, and was dried at 80° C. in vacuo for one day. Thereby, 124 g of ethylene polymer was obtained.

Example 88

[Ethylene polymerization]

Polymerization of ethylene was conducted in the same manner as in [Ethylene polymerization] in Example 87 except that the amount of the n-butylethylmagnesium solution (1.47 M) in heptane was changed from 0.14 mL to 0.07 mL (0.1 mmol). As the result, 125 g of ethylene polymer was obtained.

Example 89

[Ethylene polymerization]

Polymerization of ethylene was conducted in the same manner as in [Ethylene polymerization] in Example 87 except that the amount of the n-butylethylmagnesium solution (1.47 M) in heptane was changed from 0.14 mL to 0.27 mL (0.4 mmol). As the result, 75 g of ethylene polymer was obtained.

Example 90

[Catalyst component preparation]

In a 100 mL-glass vessel, were placed 370 mg of B-38, and 10 mL of toluene. Thereto, were added 0.21 mL (0.3 mmol) of a triethylaluminum solution (1.44 M) in toluene, and 1.18 mg (3 μmol) of bis(indenyl)zirconium dichloride. The mixture was stirred for 15 hours to obtain a catalyst component slurry.

[Ethylene polymerization]

In a 2-liter autoclave, were placed 500 mL of toluene, and 0.20 mL (0.2 mmol) of a diethylzinc solution (1.02 M) in hexane. The inside temperature of the autoclave was raised to 75° C. Then ethylene was introduced to a partial pressure of 6 kgf/cm². The mixture was stirred at 75° C. for 30 minutes. The entire of the above catalyst component slurry was put into this autoclave to start polymerization. During the polymerization, ethylene was introduced continuously to keep the ethylene partial pressure at 6 kgf/cm², and the polymerization temperature was controlled to be at 80° C. After 60 minutes of polymerization, 3 mL of ethyl alcohol was introduced into the autoclave to decompose the catalyst to stop the polymerization. The autoclave was degassed to the internal pressure of 0 kgf/cm². The formed ethylene polymer was collected by filtration, and was dried at 80° C. in vacuo for one day. As the result, 97 g of ethylene polymer was obtained.

Example 91

[Ethylene polymerization]

Polymerization of ethylene was conducted in the same manner as in [Ethylene polymerization] in Example 90 except that the amount of the diethylzinc solution (1.02 M) in hexane was changed from 0.20 mL to 0.10 mL (0.1 mmol). As the result, 69 g of ethylene polymer was obtained.

Example 92

[Ethylene polymerization]

Polymerization of ethylene was conducted in the same manner as in [Ethylene polymerization] in Example 90 except that the amount of the diethylzinc solution (1.02 M) in hexane was changed from 0.20 mL to 0.39 mL (0.4 mmol). As the result, 92 g of ethylene polymer was obtained.

Comparative Example 2

[Catalyst component preparation]

In a 100 mL-glass vessel, 10 mL of toluene were placed. Thereto, were added 0.21 mL (0.3 mmol) of a trietylaluminum solution (1.44M) in toluene, and 0,39 mg (1 μmol) of bis(indenyl)zirconium dichloride. The mixture was stirred for 15 hours to obtain a catalyst component solution.

[Ethylene polymerization]

In a 2-liter autoclave, were placed 500 mL of toluene, and 0.14 mL (0.2 mmol) of a triethylaluminum solution (1.44 M) in toluene. The inside temperature of the autoclave was raised to 75° C. Then ethylene was introduced to a partial pressure of 6 kgf/cm$^2$. The mixture was stirred at 75° C. for 30 minutes. The entire of the above catalyst component solution was put into this autoclave to start polymerization. During the polymerization, ethylene was introduced continuously to keep the ethylene partial pressure at 6 kgf/cm$^2$, and the polymerization temperature was controlled to be at 80° C. After 60 minutes of polymerization, 3 mL of ethyl alcohol was introduced into the autoclave to decompose the catalyst to stop the polymerization. The autoclave was degassed to the internal pressure of 0 kgf/cm$^2$. The formed ethylene polymer was collected by filtration, and was dried at 80° C. in vacuo for one day. As the result, 0.2 g of ethylene polymer was obtained.

Table 11 shows the reaction conditions and the polymerization results of Examples 85–92 and Comparative Example 2.

Example 93

[Catalyst component preparation]

The catalyst component slurry was prepared in the same manner as in [Catalyst component preparation] in Example 85 except that 310 mg of B-38 as Component [B], 5 μmol of ethylenebis(indenyl)zirconium dichloride as Component [A], and 0.28 ml (0.4 mmol) of a solution of triethylaluminum (1.44 M) in toluene as Component [C] were used.

[Propylene polymerization]

In a 2-liter autoclave, were placed 500 mL of toluene, and 0.14 mL (0.2 mmol) of an n-butylethylmagnesium solution (1.47 M) in heptane. The inside temperature of the autoclave was raised to 35° C. Then 500 mL of propylene was introduced thereto. The mixture was stirred at 35° C. for 30 minutes. The entire of the above catalyst component slurry was put into this autoclave to start polymerization. During the polymerization, the polymerization temperature was controlled to be at 40° C. After 60 minutes of polymerization, 3 mL of ethyl alcohol was introduced into the autoclave to decompose the catalyst to stop the polymerization. The autoclave was degassed to the internal pressure of 0 kgf/cm$^2$. The formed propylene polymer was collected by filtration, and was dried at 80° C. in vacuo for one day. Thereby, 75 g of an isotactic propylene polymer was obtained.

As described above, with the catalyst of the present invention, an olefin polymer can be produced at a high catalyst activity without using an expensive catalyst component. Details of Preparations I–IV are given in Table 1; Preparations V–XI in Table 2; Preparations XII–XXII in Table 3: and Preparations XXIV–XXXIV in Table 4 (See pages 111–114). Details of Examples 1–5 and Comparative Example 1 are given in Table 5; Examples 6–25 in Table 6; Example 26–42 in Table 7; Examples 43–59 in Table 8; Examples 60–77 in Table 9; Examples 78–83 in Table 10; Examples 85–92 and Comparative Example 2 in Table 11 (See pages 115–121).

TABLE 1

| Preparation No. | Reduction reaction[a] | | | | Salt treatment | | Product Component [B] |
|---|---|---|---|---|---|---|---|
| | [Q][b] | Red[c] | Red/[Q] (molar ratio) | Reaction time | Salts[d] | Solvent[e] | |
| I | MoS$_2$ | nBuLi | 2.1 | 7 days | Ph(Me)$_2$N.HCl | H$_2$O | B-1 |
| II | MoS$_2$ | nBuLi | 2.1 | 7 days | Ph(Me)$_2$N.HClO$_4$ | THF | B-2 |
| III | MoS$_2$ | nBuLi | 1.0 | 24 hours | Ph(Me)$_2$N.HCl | H$_2$O | B-3 |
| IV | MoS$_2$ | nBuLi | 0.5 | 24 hours | Ph(Me)$_2$N.HCl | H$_2$O | B-4 |

[a]Reaction solvent: n-Hexane
[b]Host compound
[c]Reducing agent, nBuLi: n-Butyllithium
[d]Ph(Me)$_2$N.HCl: Dimethylaniline hydrochloride
Ph(Me)$_2$N.HClO$_4$: Dimethylaniline perchlorate
[e]THF: Tetrahydrofuran

TABLE 2

| Preparation No | Reduction reaction[a] | | | Lewis base treatment[d] | | | Salt treatment | | Product Component [B] |
|---|---|---|---|---|---|---|---|---|---|
| | [Q][b] | Red[c] | Red/[Q] (molar ratio) | Lewis[e] base | Concentration (wt %) | Reaction time (hours) | Salt[f] | Solvent | |
| V | MoS$_2$ | nBuLi | 2.1 | NH$_3$ | 25 | 3 | Ph(Me)$_2$N.HCl | H$_2$O | B-5 |
| VI | MoS$_2$ | nBuLi | 0.8 | NH$_3$ | 25 | 3 | Ph(Me)$_2$N.HCl | H$_2$O | B-6 |
| VII | MoS$_2$ | nBuLi | 0.5 | NH$_3$ | 25 | 3 | Ph(Me)$_2$N.HCl | H$_2$O | B-7 |
| VIII | MoS$_2$ | nBuLi | 2.1 | NH$_3$ | 25 | 0.5 | Ph(Me)$_2$N.HCl | H$_2$O | B-8 |
| IX | MoS$_2$ | nBuLi | 1.0 | NH$_3$ | 0.25 | 3 | Ph(Me)$_2$N.HCl | H$_2$O | B-9 |

TABLE 2-continued

| Prepa-ation No | Reduction reaction[a] | | | Lewis base treatment[d] | | | Salt treatment | | Product Component [B] |
|---|---|---|---|---|---|---|---|---|---|
| | [Q][b] | Red[c] | Red/[Q] (molar ratio) | Lewis[e] base | Concent-ration (wt %) | Reaction time (hours) | Salt[f] | Solvent | |
| X | $MoS_2$ | nBuLi | 1.0 | — | — | 3 | $Ph(Me)_2N.HCl$ | $H_2O$ | B-10 |
| XI | $MoS_2$ | nBuLi | 2.1 | t-$BuNH_2$ | 28 | 3 | $Ph(Me)_2N.HCl$ | $H_2O$ | B-11 |

[a]Reaction solvent: n-Hexane
[b]Host compound
[c]Reducing agent, nBuLi: n-Butyllithium
[d]Treatment solvent: $H_2O$
[e]t-$BuNH_2$: t-Butylamine
[f]$Ph(Me)_2N.HCl$: Dimethylaniline hydrochloride

TABLE 3

| Prepa-ation No. | Reduction reaction[a] | | | Lewis base treatment[d] Lewis base | Salt treatment[e] Salt[g] | Acid treatment[f] Acid | Product Component [B] |
|---|---|---|---|---|---|---|---|
| | [Q][b] | Red[c] | Red/[Q] (molar ratio) | | | | |
| XII | $MoS_2$ | nBuLi | 2.1 | $NH_3$ | (Dodecyl)$NH_2.HCl$ | — | B-12 |
| XIII | $MoS_2$ | nBuLi | 0.8 | $NH_3$ | (Dodecyl)$NH_2.HCl$ | — | B-13 |
| XIV | $MoS_2$ | nBuLi | 0.8 | $NH_3$ | (Octadecyl)(Me)$_2$N.HCl | — | B-14 |
| XV | $MoS_2$ | nBuLi | 0.8 | $NH_3$ | (Octadecyl)$_2$(Me)N.HCl | — | B-15 |
| XVI | $MoS_2$ | nBuLi | 1.0 | $NH_3$ | $ZrCl_4$ | — | B-16 |
| XVII | $MoS_2$ | nBuLi | 1.0 | $NH_3$ | $FeCl_3.6H_2O$ | — | B-17 |
| XVIII | $MoS_2$ | nBuLi | 1.0 | $NH_3$ | $FeCl_3.6H_2O$ | — | B-18[h] |
| XIX | $MoS_2$ | nBuLi | 1.0 | $NH_3$ | $AlCl_3.6H_2O$ | — | B-19 |
| XX | $MoS_2$ | nBuLi | 1.0 | $NH_3$ | $FeCl_2.4H_2O$ | — | B-20 |
| XXI | $MoS_2$ | nBuLi | 1.0 | $NH_3$ | $AgNO_3$ | — | B-21 |
| XXII | $MoS_2$ | nBuLi | 1.0 | $NH_3$ | — | HCl | B-22 |

[a]Reaction solvent: n-Hexane
[b]Host compound
[c]Reducing agent, nBuLi: n-Butyllithium
[d], [e], and [f]: Treatment solvent: $H_2O$
[g](Dodecyl)$NH_2.HCl$: Dodecylamine hydrochloride
(Octadecyl)(Me)$_2$N.HCl: Dimethyloctadecylamine hydrochloride
(Octadecyl)$_2$(Me)N.HCl: Methyldioctadecylamine hydrochloride
[h]B-17 further dried at 500° C.

TABLE 4

| Prepa-ation No. | Reduction reaction | | | Lewis base treatment | | Salt treatment | | Acid treatment Acid | Product Component [B] |
|---|---|---|---|---|---|---|---|---|---|
| | [Q][a] | Red[b] | Solvent[c] | Lewis base | Solvent[e] | Salt[f] | Solvent[g] | | |
| XXIV | $TaS_2$ | nBuLi | $C_6H_{14}$ | — | — | $Ph(Me)_2N.HCl$ | $H_2O$ | — | B-24 |
| XXV | $TaS_2$ | nBuLi | $C_6H_{14}$ | $NH_3$ | $H_2O$ | $Ph(Me)_2N.HCl$ | $H_2O$ | — | B-25 |
| XXVI | $TaS_2$ | Naph Li$^+$ | THF | — | — | $Ph(Me)_2N.HClO_4$ | THF | — | B-26 |
| XXVII | $TiS_2$ | nBuLi | $C_6H_{14}$ | — | $H_2O$ | $Ph(Me)_2N.HCl$ | $H_2O$ | — | B-27 |
| XXVIII | $MoO_3$ | $Na_2S_2O_4$ | $H_2O$ | — | — | $Ph(Me)_2N.HCl$ | $H_2O$ | — | B-28 |
| XXIX | $MoO_3$ | $Na_2S_2O_4$ | $H_2O$ | — | — | — | — | HCl | B-29 |
| XXX | $MoO_3$ | $Na_2S_2O_4$ | $H_2O$ | $Ph(Me)_2N$ | EtOH | — | — | HCl | B-30 |
| XXXI | $V_2O_5$ | nBuLi | $C_6H_{14}$ | — | — | $Ph(Me)_2N.HCl$ | $H_2O$ | — | B-31 |
| XXXII | $MoO_2$ | nBuLi | $C_6H_{14}$ | $NH_3$ | $H_2O$ | $Ph(Me)_2N.HCl$ | $H_2O$ | — | B-32 |
| XXXIII | $Mo_6S_8$ | nBuLi | $C_6H_{14}$ | $NH_3$ | $H_2O$ | $Ph(Me)_2N.HCl$ | $H_2O$ | — | B-33 |
| XXXIV | $Mo_6S_8$ | nBuLi | $C_6H_{14}$ | $NH_3$ | $H_2O$ | $FeCl_3.6H_2O$ | $H_2O$ | — | B-34 |

[a]Host compound
[b]Reducing agent: nBuLi: n-Butyllitium, Naph Li$^+$: Naphthalenelithium, $Na_2S_2O_4$: Sodium dithionite
[c]$C_6H_{14}$: n-Hexane, THF: Tetrahydrofuran
[d]$Ph(Me)_2N$: Dimethylaniline
[e]EtOH: Ethyl alcohol
[f]$Ph(Me)_2N.HCl$: Dimethylaniline hydrochloride, $Ph(Me)_2N.HClO_4$: Dimethylaniline perchlorate
[g]THF: Tetrahydrofurane
[h]Treatment solvent: $H_2O$

TABLE 5

| | Component (A)[a] | (μmol) | Component (B) | (mg) | Component (C)[b] | (mmol) | Solvent | (mL) | Ethylene (kgf/cm²) | Temperature (°C.) | Time (min) | Catalyst activity (kg/mmolZr) |
|---|---|---|---|---|---|---|---|---|---|---|---|---|
| Example | | | | | | | | | | | | |
| 1 | Ind₂ZrCl₂ | 1 | B-1 | 168 | TEAL | 0.5 | Toluene | 500 | 20 | 80 | 60 | 31 |
| 2 | Ind₂ZrCl₂ | 1 | B-1 | 25 | TEAL | 0.5 | Toluene | 500 | 20 | 80 | 60 | 12 |
| 3 | Ind₂ZrCl₂ | 1 | B-2 | 165 | TEAL | 0.5 | Toluene | 500 | 20 | 80 | 60 | 16 |
| 4 | Ind₂ZrCl₂ | 1 | B-3 | 161 | TEAL | 0.5 | Toluene | 500 | 20 | 80 | 60 | 18 |
| 5 | Ind₂ZrCl₂ | 1 | B-4 | 161 | TEAL | 0.5 | Toluene | 500 | 20 | 80 | 60 | 4.6 |
| Comparative Example | | | | | | | | | | | | |
| 1 | Ind₂ZrCl₂ | 1 | — | — | TEAL | 0.5 | Toluene | 500 | 20 | 80 | 60 | 0.5 |

[a]In₂ZrCl₂: Bis(indenyl)zirconium dichloride
[b]TEAL: Triethylaluminum

TABLE 6

| | Component (A)[a] | (μmol) | Component (B) | (mg) | Component (C)[b] | (mmol) | Solvent | (mL) | Ethylene (kgf/cm²) | Temperature (°C.) | Time (min) | Catalyst activity (kg/mmolZr) |
|---|---|---|---|---|---|---|---|---|---|---|---|---|
| Example | | | | | | | | | | | | |
| 6 | Ind₂ZrCl₂ | 1 | B-5 | 124 | TEAL | 0.5 | Toluene | 500 | 20 | 80 | 60 | 115 |
| 7 | Ind₂ZrCl₂ | 1 | B-5 | 66 | TEAL | 0.5 | Toluene | 500 | 20 | 80 | 60 | 36 |
| 8 | Ind₂ZrCl₂ | 1 | B-5 | 26 | TEAL | 0.5 | Toluene | 500 | 20 | 80 | 60 | 27 |
| 9 | Ind₂ZrCl₂ | 1 | B-6 | 167 | TEAL | 0.5 | Toluene | 500 | 20 | 80 | 60 | 100 |
| 10 | Ind₂ZrCl₂ | 1 | B-6 | 121 | TEAL | 0.5 | Toluene | 500 | 20 | 80 | 60 | 91 |
| 11 | Ind₂ZrCl₂ | 1 | B-6 | 65 | TEAL | 0.5 | Toluene | 500 | 20 | 80 | 60 | 32 |
| 12 | Ind₂ZrCl₂ | 1 | B-6 | 26 | TEAL | 0.5 | Toluene | 500 | 20 | 80 | 60 | 23 |
| 13 | Ind₂ZrCl₂ | 1 | B-7 | 184 | TEAL | 0.5 | Toluene | 500 | 20 | 80 | 60 | 82 |
| 14 | Ind₂ZrCl₂ | 1 | B-7 | 121 | TEAL | 0.5 | Toluene | 500 | 20 | 80 | 60 | 46 |
| 15 | Ind₂ZrCl₂ | 1 | B-7 | 65 | TEAL | 0.5 | Toluene | 500 | 20 | 80 | 60 | 37 |
| 16 | Ind₂ZrCl₂ | 1 | B-B | 182 | TEAL | 0.5 | Toluene | 5oo | 20 | 80 | 60 | 121 |
| 17 | Ind₂ZrCl₂ | 1 | B-8 | 123 | TEAL | 0.5 | Toluene | 500 | 20 | 80 | 60 | 71 |
| 18 | Ind₂ZrCl₂ | 1 | B-8 | 60 | TEAL | 0.5 | Toluene | 500 | 20 | 80 | 60 | 48 |
| 19 | Ind₂ZrCl₂ | 1 | B-9 | 121 | TEAL | 0.5 | Toluene | 500 | 20 | 80 | 60 | 147 |
| 20 | Ind₂ZrCl₂ | 1 | B-9 | 62 | TEAL | 0.5 | Toluene | 500 | 20 | 80 | 60 | 84 |
| 21 | Ind₂ZrCl₂ | 1 | B-10 | 121 | TEAL | 0.5 | Toluene | 500 | 20 | 80 | 60 | 70 |
| 22 | Ind₂ZrCl₂ | 1 | B-10 | 62 | TEAL | 0.5 | Toluene | 500 | 20 | 80 | 60 | 51 |
| 23 | Ind₂ZrCl₂ | 1 | B-11 | 166 | TEAL | 0.5 | Toluene | 500 | 20 | 80 | 60 | 177 |
| 24 | Ind₂ZrCl₂ | 1 | B-11 | 123 | TEAL | 0.5 | Toluene | 500 | 20 | 80 | 60 | 137 |
| 25 | Ind₂ZrCl₂ | 1 | B-11 | 60 | TEAL | 0.5 | Toluene | 500 | 20 | 80 | 60 | 54 |

[a]Ind₂ZrCl₂: Bis(indenyl)zirconium dichloride
[b]TEAL: Triethylaluminum

TABLE 7

| | Component (A)[a] | (μmol) | Component (B) | (mg) | Component (C)[b] | (mmol) | Solvent | (mL) | Ethylene (kgf/cm²) | Temperature (°C.) | Time (min) | Catalyst activity (kg/mmolZr) |
|---|---|---|---|---|---|---|---|---|---|---|---|---|
| Example | | | | | | | | | | | | |
| 26 | Ind₂ZrCl₂ | 1 | B-12 | 68 | TEAL | 0.5 | Toluene | 500 | 20 | 80 | 60 | 52 |
| 27 | Ind₂ZrCl₂ | 1 | B-12 | 39 | TEAL | 0.5 | Toluene | 500 | 20 | 80 | 60 | 40 |
| 28 | Ind₂ZrCl₂ | 1 | B-13 | 101 | TEAL | 0.5 | Toluene | 500 | 20 | 80 | 60 | 56 |
| 29 | Ind₂ZrCl₂ | 1 | B-13 | 68 | TEAL | 0.5 | Toluene | 500 | 20 | 80 | 60 | 55 |
| 30 | Ind₂ZrCl₂ | 1 | B-13 | 38 | TEAL | 0.5 | Toluene | 500 | 20 | 80 | 60 | 42 |
| 31 | Ind₂ZrCl₂ | 1 | B-16 | 360 | TEAL | 0.5 | Toluene | 500 | 20 | 80 | 60 | 120 |
| 32 | Ind₂ZrCl₂ | 1 | B-16 | 239 | TEAL | 0.s | Toluene | 500 | 20 | 80 | 60 | 62 |
| 33 | Ind₂ZrCl₂ | 1 | B-17 | 368 | TEAL | 0.5 | Toluene | 500 | 20 | 80 | 60 | 76 |
| 34 | Ind₂ZrCl₂ | 1 | B-17 | 242 | TEAL | 0.5 | Toluene | 500 | 20 | 80 | 60 | 67 |
| 35 | Ind₂ZrCl₂ | 1 | B-17 | 122 | TEAL | 0.5 | Toluene | 500 | 20 | 80 | 60 | 26 |
| 36 | Ind₂ZrCl₂ | 1 | B-18 | 357 | TEAL | 0.5 | Toluene | 500 | 20 | 80 | 60 | 81 |
| 37 | Ind₂ZrCl₂ | 1 | B-19 | 239 | TEAL | 0.5 | Toluene | 500 | 20 | 80 | 60 | 45 |
| 38 | Ind₂ZrCl₂ | 1 | B-20 | 240 | TEAL | 0.5 | Toluene | 500 | 20 | 80 | 60 | 17 |
| 39 | Ind₂ZrCl₂ | 1 | B-21 | 236 | TEAL | 0.5 | Toluene | 500 | 20 | 80 | 60 | 9 |
| 40 | Ind₂ZrCl₂ | 1 | B-22 | 483 | TEAL | 0.5 | Toluene | 500 | 20 | 80 | 60 | 182 |

TABLE 7-continued

| | Component (A)[a] | | Component (B) | Component (C)[b] | | Solvent | | Ethylene | Temperature | Time | Catalyst activity |
|---|---|---|---|---|---|---|---|---|---|---|---|
| | | (μmol) | (mg) | | (mmol) | | (mL) | (kgf/cm$^2$) | (° C.) | (min) | (kg/mmolZr) |
| 41 | Ind$_2$ZrCl$_2$ | 1 | B-22 | 237 | TEAL | 0.5 | Toluene | 500 | 20 | 80 | 60 | 71 |
| 42 | Ind$_2$ZrCl$_2$ | 1 | B-23 | 120 | TEAL | 0.5 | Toluene | 500 | 20 | 80 | 60 | 43 |

[a]Ind$_2$ZrCl$_2$: Bis(indenyl)zirconium dichloride
[b]TEAL: Triethylaluminum

TABLE 8

| | Component (A)[a] | | Component (B) | Component (C)[b] | | Solvent | | Ethylene | Temperature | Time | Catalyst activity |
|---|---|---|---|---|---|---|---|---|---|---|---|
| | | (μmol) | (mg) | | (mmol) | | (mL) | (kgf/cm$^2$) | (° C.) | (min) | (kg/mmolZr) |
| Example | | | | | | | | | | | | |
| 43 | Ind$_2$ZrCl$_2$ | 1 | B-24 | 130 | TEAL | 0.5 | Toluene | 500 | 20 | 80 | 60 | 42 |
| 44 | Ind$_2$ZrCl$_2$ | 1 | B-24 | 25 | TEAL | 0.5 | Toluene | 500 | 20 | 80 | 60 | 26 |
| 45 | Ind$_2$ZrCl$_2$ | 1 | B-24 | 5 | TEAL | 0.5 | Toluene | 500 | 20 | 80 | 60 | 3 |
| 46 | Ind$_2$ZrCl$_2$ | 1 | B-25 | 163 | TEAL | 0.5 | Toluene | 500 | 20 | 80 | 60 | 60 |
| 47 | Ind$_2$ZrCl$_2$ | 1 | B-25 | 127 | TEAL | 0.5 | Toluene | 500 | 20 | 80 | 60 | 52 |
| 48 | Ind$_2$ZrCl$_2$ | 1 | B-26 | 163 | TEAL | 0.5 | Toluene | 500 | 20 | 80 | 60 | 13 |
| 49 | Ind$_2$ZrCl$_2$ | 1 | B-26 | 129 | TEAL | 0.5 | Toluene | 500 | 20 | 80 | 60 | 8 |
| 50 | Ind$_2$ZrCl$_2$ | 1 | B-27 | 481 | TEAL | 0.5 | Tbluene | 500 | 20 | 80 | 60 | 1 |
| 51 | Ind$_2$ZrCl$_2$ | 1 | B-28 | 25 | TEAL | 0.5 | Toluene | 500 | 20 | 80 | 60 | 7 |
| 52 | Ind$_2$ZrCl$_2$ | 1 | B-29 | 25 | TEAL | 0.5 | Toluene | 500 | 20 | 80 | 60 | 6 |
| 53 | Ind$_2$ZrCl$_2$ | 1 | B-30 | 27 | TEAL | 0.5 | Toluene | 500 | 20 | 80 | 60 | 4 |
| 54 | Ind$_2$ZrCl$_2$ | 1 | B-31 | 183 | TEAL | 0.5 | Toluene | 500 | 20 | 80 | 60 | 6 |
| 55 | Ind$_2$ZrCl$_2$ | 1 | B-32 | 125 | TEAL | 0.5 | Toluene | 500 | 20 | 80 | 60 | 7 |
| 56 | Ind$_2$ZrCl$_2$ | 1 | B-33 | 125 | TEAL | 0.5 | Toluene | 500 | 20 | 80 | 60 | 1 |
| 57 | Ind$_2$ZrCl$_2$ | 1 | B-34 | 125 | TEAL | 0.5 | Toluene | 500 | 20 | 80 | 60 | 2 |
| 58 | Ind$_2$ZrCl$_2$ | i | B-35 | 125 | TEAL | 0.5 | Toluene | 500 | 20 | 80 | 60 | 1 |
| 59 | Ind$_2$ZrCl$_2$ | 1 | B-36 | 125 | TEAL | 0.5 | Toluene | 500 | 20 | 80 | 60 | 1 |

[a]Ind$_2$ZrCl$_2$: Bis(indenyl)zirconium dichloride
[b]TEAL: Triethylaluminum

TABLE 9

| | Component (A)[a] | | Component (B) | Component (C)[b] | | Solvent | | Ethylene | Temperature | Time | Catalyst activity |
|---|---|---|---|---|---|---|---|---|---|---|---|
| | | (μmol) | (mg) | | (mmol) | | (mL) | (kgf/cm$^2$) | (° C.) | (min) | (kg/mmolZr.h) |
| Example | | | | | | | | | | | | |
| 60 | (1,3-Me$_2$Cp)$_2$ZrCl$_2$ | 1 | B-5 | 121 | TEAL | 0.5 | Toluene | 500 | 20 | 80 | 60 | 46 |
| 61 | Et(Ind)$_2$ZnCl$_2$ | 1 | B-5 | 124 | TEAL | 0.5 | Toluene | 500 | 20 | 80 | 60 | 59 |
| 62 | Ind$_2$ZrCl$_2$ | 1 | B-5 | 121 | TEAL | 0.5 | Toluene | 500 | 6 | 80 | 60 | 26 |
| 63 | Ind$_2$ZrCl$_2$ | 1 | B-5 | 124 | TEAL | 1.0 | Toluene | 500 | 6 | 80 | 60 | 13 |
| 64 | Ind$_2$ZrCl$_2$ | 1 | B-5 | 120 | TEAL | 2.0 | Toluene | 500 | 6 | 80 | 60 | 8 |
| 65 | Ind$_2$ZrCl$_2$ | 3 | B-6 | 363 | TEAL | 0.5 | Toluene | 500 | 6 | 80 | 60 | 34 |
| 66 | Ind$_2$ZrCl$_2$ | 1 | B-6 | 130 | TEAL | 0.5 | Toluene | 500 | 6 | 80 | 60 | 25 |
| 67 | Ind$_2$ZrCl$_2$ | 1 | B-6 | 121 | TIBAL | 0.5 | Toluene | 500 | 6 | 80 | 60 | 19 |
| 68 | Ind$_2$ZrCl$_2$ | 1 | B-5 | 120 | TMAL | 0.5 | Toluene | 500 | 6 | 80 | 60 | 5 |
| 69 | Ind$_2$ZrCl$_2$ | 1 | B-5 | 124 | TMAL | 2.0 | Toluene | 500 | 6 | 80 | 60 | 4 |
| 70 | Ind$_2$ZrCl$_2$ | 1 | B-6 | 170 | TEAL | 0.5 | Hexane | 1200 | 6 | 80 | 90 | 44 |
| 71 | Ind$_2$ZrCl$_2$ | 1 | B-6 | 129 | TEAL | 0.5 | Hexane | 1200 | 6 | 80 | 90 | 27 |
| 72 | Ind$_2$ZrCl$_2$ | 1 | B-6 | 132 | TEAL | 0.5 | Hexane | 1200 | 20 | 80 | 90 | 147 |
| 73 | Ind$_2$ZrCl$_2$ | 1 | B-6 | 66 | TEAL | 0.5 | Hexane | 1200 | 20 | 80 | 90 | 110 |
| 74 | Ind$_2$ZrCl$_2$ | 1 | B-14 | 65 | TEAL | 0.5 | Hexane | 1200 | 20 | 80 | 90 | 61 |
| 75 | Ind$_2$ZrCl$_2$ | 1 | B-14 | 31 | TEAL | 0.5 | Hexane | 1200 | 20 | 80 | 90 | 49 |
| 76 | Ind$_2$ZrCl$_2$ | 1 | B-15 | 61 | TEAL | 0.5 | Hexane | 1200 | 20 | 80 | 90 | 25 |
| 77 | Ind$_2$ZrCl$_2$ | 1 | B-15 | 30 | TEAL | 0.5 | Hexane | 1200 | 20 | 80 | 90 | 35 |

[a](1,3-Me$_2$Cp)$_2$ZrCl$_2$: Bis(1,3-dimethylcyclopentadienyl)zirconium dichloride
Et(Ind)$_2$ZrCl$_2$: Ethylenebis(indenyl)zirconium dichloride
Ind$_2$ZrCl$_2$: Bis(indenyl)zirconium dichloride
[b]TEAL: Triethylaluminum, TIBAL: Triisobutylaluminum, TMAL: Trimethylaluminum

TABLE 10

| Component (A)[a] | | Component (B) | | Component (C)[b] | | Solvent[c] | Etylene | Hexene-1 | Temperature | Time | Catalyst activity |
|---|---|---|---|---|---|---|---|---|---|---|---|
| | (µmol) | | (mg) | | (mmol) | | (mL) | (kgf/cm²) | (mL) | (° C.) | (min) | (kg/mmolZr) |

Example

| 78 | Ind$_2$ZrCl$_2$ | 3 | B-6 | 364 | TEAL | 0.50 | Hexane | 1200 | 6 | 20 | 80 | 90 | 24 |
| 79 | Ph$_2$CCp(Flu)ZrCl$_2$ | 1 | B-6 | 120 | TEAL | 0.30 | IP | 600 | 20 | 20 | 170 | 10 | 11 |
| 80 | Ph$_2$CCp(Flu)ZrCl$_2$ | 1 | B-14 | 62 | TEAL | 0.30 | IP | 600 | 20 | 20 | 170 | 10 | 4 |
| 81 | Ph$_2$CCp(Flu)ZrCl$_2$ | 1 | B-15 | 59 | TEAL | 0.30 | IP | 600 | 20 | 20 | 170 | 10 | 3 |
| 82 | Ph$_2$CCp(Bu$_2$Flu)ZrCl$_2$ | 1 | B-6 | 179 | TEAL | 0.30 | IP | 600 | 20 | 20 | 170 | 10 | 15 |
| 83 | Ph$_2$CCp(Bu$_2$Flu)ZrCl$_2$ | 5 | B-6 | 903 | TEAL | 1.50 | IP | 600 | 20 | 20 | 170 | 10 | 8 |

[a]Ind$_2$ZrCl$_2$: Bis(indenyl)zirconium chloride
Ph$_2$CCp(Flu)ZrCl$_2$: Diphenylmethyelne (cyclopentadienyl) (fluorenyl) zirconium dichloride
Ph$_2$CCp(Bu$_2$Flu)ZrCl$_2$: Diphenylmethylene (cyclopentadienyl) (2,7-di-t-butylfluorenyl) zirconium dicholride
[b]TEAL: Triethylaluminum
[c]IP: IP Solvent 1620, produced by Idemitsu Sekiyu Kagaku K.K.

TABLE 11

| | Component [A][a] | | Component [B] | | Component [C][b] | | Component [D][c] | | Ethylene | 1-Hexane | Catalyst activity |
|---|---|---|---|---|---|---|---|---|---|---|---|
| | (µmol) | | (mg) | | (mmol) | | (mmol) | (kgf/cmhu 2) | (mL) | (kg/mmolZr) |

Example

| 85 | Ind$_2$ZrCl$_2$ | 1 | B-37 | 123 | TEAL | 0.3 | BuEtMg | 0.2 | 6 | — | 41 |
| 86 | Ind$_2$ZrCl$_2$ | 1 | B-37 | 123 | TEAL | 0.3 | BuEtMg | 0.2 | 6 | 20 | 35 |
| 97 | Ind$_2$ZrCl$_2$ | 3 | B-38 | 371 | TEAL | 0.3 | BuEtMg | 0.2 | 6 | — | 41 |
| 88 | Ind$_2$ZrCl$_2$ | 3 | B-38 | 371 | TEAL | 0.3 | BuEtMg | 0.1 | 6 | — | 42 |
| 89 | Ind$_2$ZrCl$_2$ | 3 | B-38 | 371 | TEAL | 0.3 | BuEtMg | 0.4 | 6 | — | 25 |
| 90 | Ind$_2$ZrCl$_2$ | 3 | B-38 | 370 | TEAL | 0.3 | Et$_2$Zn | 0.2 | 6 | — | 32 |
| 91 | Ind$_2$ZrCl$_2$ | 3 | B-38 | 370 | TEAL | 0.3 | Et$_2$Zn | 0.1 | 6 | — | 23 |
| 92 | Ind$_2$ZrCl$_2$ | 3 | B-38 | 370 | TEAL | 0.3 | Et$_2$Zn | 0.4 | 6 | — | 31 |

Comparative Example

| 2 | Ind$_2$ZrCl$_2$ | 1 | — | — | TEAL | 0.5 | — | — | 6 | — | 0.2 |

[a]Ind$_2$ZrCl$_2$: Bis(indenyl)zirconium dichloride
[b]TEAL: Triethylaluminum
[c]BuEtMg: n-Butylethylmagnesium, Et$_2$Zn: Diethylzinc
Polymerization temperature: 80° C.
Polymerization time: 60 minutes

What is claimed is:

1. As olefin polymerization catalyst comprising (A) a metallocene compound containing a transition metal selected from Groups, 3, 4, 5, and 6 of the Periodic Table, (B) a reaction product of topotactic reduction by electron transfer, represented by the General Formula

$$E^{n+}{}_{(k/n)}(L^2)_h(Q)^{k-} \tag{36}$$

where (Q) is a host compound selected from compounds of three-dimensional structure, two-dimensional structure and one-dimensional structure, and compounds of a molecular solid, said three-dimensional structure compounds selected from: hexamolybdenum octasulfide octaselenide, trimolybdenum tetrasulfide, trititanium tetrasulfide, hexatitanium octaselenide, triniobium tetrasulfide, hexavanadium octasulfide, pentavanadium octasulfide, divanadium pentaoxide, tungsten trioxide, titanium dioxide, vanadium dioxide, chromium dioxide, manganese dioxide, tungsten dioxide, molybdenum dioxide, ruthenium dioxide, osmium dioxide, or iridium dioxide;

said two-dimensional structure compounds selected from: titanium disulfide, zirconium disulfide, hafnium disulfide, vanadium disulfide, niobium disulfide, tantalum disulfide, chromium disulfide, molybdenum disulfide, tungsten disulfide, rhenium disulfide, platinum disulfide, tin disulfide, lead disulfide, titanium diselenide, zirconium diselenide, hafnium diselenide, vanadium diselenide, niobium diselenide, tantalum diselenide, chromium diselenide, molybdenum diselenide, tungsten diselenide, rhenium diselenide, platinum diselenide, tin diselenide, lead diselenide, titanium ditelluride, zirconium ditelluride, hafnium ditelluride, vanadium ditelluride, niobium ditelluride, tantalum ditelluride, chromium ditelluride, molybdenum ditelluride, tungsten ditelluride, rhenium ditelluride, platinum ditelluride, tin ditelluride, lead ditelluride, magnesium phosphorus trisulfide, calcium phosphorus trisulfide, vanadium phosphorus trisulfide, manganese phosphorus trisulfide, iron phosphorus trisulfide, cobalt phosphorus trisulfide, nickel phosphorus trisulfide, palladium phosphorus trisulfide, zinc phosphorus trisulfide, cadmium phosphorus trisulfide, mercury phosphorus trisulfide, tin phosphorus trisulfide, magnesium phosphorus triselenide, calcium phosphorus triselenide, vanadium phosphorus triselenide, manganese phosphorus triselenide, iron phosphorus triselenide, cobalt phosphorus triselenide, nickel phosphorus triselenide, palladium phosphorus triselenide, zinc phosphorus triselenide, cadmium phosphorus triselenide, mercury phosphorus triselenide, tin phosphorus triselenide, chromium phosphorus tetrasulfide, tantalum sulfide carbide, molybdenum trioxide, octadecamolybdenum dopentacontaoxide (18-molybdenum 52-oxide), divanadium pentaoxide gel, iron oxychloride, titanium oxychloride, vanadium oxychloride, chromium oxychloride, aluminum oxychloride, bismuth oxychloride, α-zirconium nitride chloride, β-zirconium nitride chloride, α-zirconium nitride bromide, β-zirconium nitride bromide, zirconium nitride iodide, titanium nitride chloride, titanium nitride bromide, titanium nitride iodide, graphite, or polyacene;

said one-dimensional structure compounds selected from: titanium trisulfide, niobium triselenide, potassium iron disulfide, polyacetylene, polyaniline, polypyrrole, polythiophene, poly(p-phenylene), poly(triphenylene), polyazulene, polyfluorene, polynaphthalene, polyanthracene, polyfuran, polycarbazole, tetrathiafluvalene-substituted polystyrene, ferrocene-substituted polyethylene, carbazole-substituted polyethylene, or polyoxyphenazine; and said molecular solid compounds selected from: tetracyanoquinodimethane, or tetrathiafluvalene;

wherein in General Formula (36) k is a number of reduction, $0 < k \leq 3$, $E^{n+}$ is an n-valent guest cation, $L^2$ is a Lewis base and h is a number of the Lewis base; and (C) an organoaluminum compound.

2. An olefin polymerization catalyst comprising (A) a metallocene compound containing a transition metal selected from Groups 3, 4, 5, and 6 of The Periodic Table, (B) a reaction product of topotactic reduction by electron transfer, (C) an organoaluminum compound, and (D) an organoalkaline earth metal compound or an organozinc compound, wherein the organoalkaline earth metal compound is represented by General Formula (33) and the organozinc compound is represented by General Formula (34):

$$M^6R^{19}_2 \quad (33)$$

where each $M^6$ is magnesium and each $R^{19}$ is independently a hydrocarbon group of 1 to 20 carbons;

$$ZnR^{20}_2 \quad (34)$$

wherein each $R^{20}$ is independently a hydrocarbon group of 1 to 20 carbons.

3. The olefin polymerization catalyst according to claim 1 or 2, wherein the component (B) is a reaction product of topotactic reduction by electron transfer, treated with a salt, an acid, and/or a Lewis base.

4. The olefin polymerization catalyst according to any of claim 1 or 2, wherein the component (C) is an organoaluminum compound represented by General Formula (32):

$$AlR^{18}_3 \quad (32)$$

where each $R^{18}$ is independently a hydrogen atom or a hydrocarbon group of 1 to 20 carbons.

5. The olefin polymerization catalyst according to claim 1 wherein component (B) is a salt of an anion, which is made of a neutral host compound with electrons in the conduction band of the host compound and with guest cations in vacant lattice sites of the host compound.

6. The olefin polymerization catalyst according to claim 1 or 2, wherein the component (A) is a metallocene compound represented by General Formula (1):

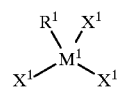

(1)

where $M^1$ is an atom of titanium, zirconium, or hafnium; each $X^1$ is independently a hydrogen atom, a halogen atom, or a hydrocarbon group of 1 to 20 carbons; and $R^1$, which is a ligand of $M^1$, is represented by General Formula (2), (3), (4), or (5):

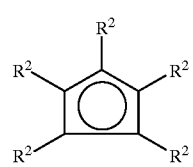

(2)

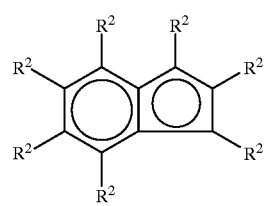

(3)

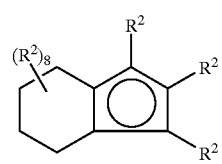

(4)

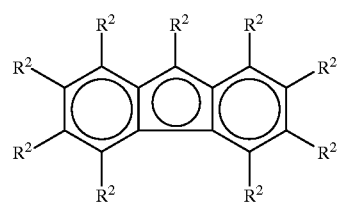

(5)

wherein each $R^2$ is independently a hydrogen atom, a halogen atom, a hydrocarbon group of 1 to 20 carbons, an amino group-containing hydrocarbon group of 1 to 20 carbons, or an oxygen-containing hydrocarbon group of 1 to 20 carbons.

7. The olefin polymerization catalyst according to claim 1 or 2, wherein the component (A) is a metallocene compound represented by General Formula (6) or (7):

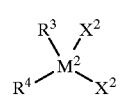

(6)

(7)
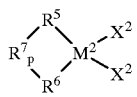

where $M^2$ is an atom of titanium, zirconium, or hafnium; each $X^2$ is independently a hydrogen atom, a halogen atom, or a hydrocarbon group of 1 to 20 carbons; and $R^3$ and $R^4$ are independently a ligand of $M^2$ and represented by General Formula (8), (9), (10) or (11):

(8)
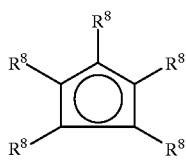

(9)
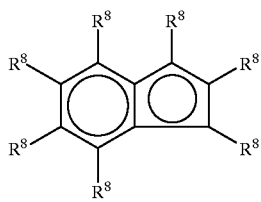

(10)
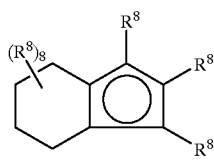

(11)
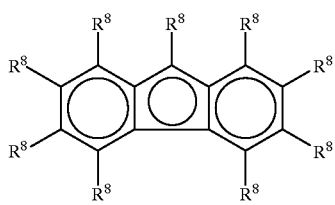

wherein each $R^8$ is independently a hydrogen atom, a halogen atom, a hydrocarbon group of 1 to 20 carbons, an amino group-containing hydrocarbon group of 1 to 20 carbons, or an oxygen-containing hydrocarbon group of 1 to 20 carbons, the ligands forming a sandwich structure together with $M^2$; $R^5$ and $R^6$ are independently a ligand of $M^2$ and represented by General formula (12), (13), (14) or (15):

(12)
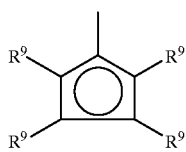

(13)
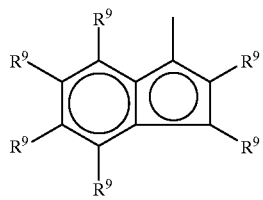

(14)
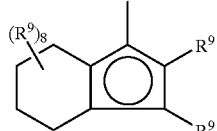

(15)
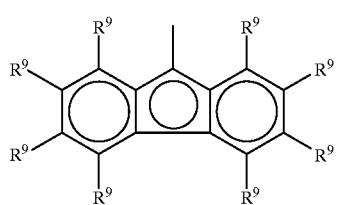

wherein each $R^9$ is independently a hydrogen atom, a halogen atom, a hydrocarbon group of 1 to 20 carbons, an amino group-containing hydrocarbon group of 1 to 20 carbons, or an oxygen-containing hydrocarbon group of 1 to 20 carbons, the ligands forming a sandwich structure together with $M^2$; $R^7$ is represented by General Formula (16) or (17):

(16)

(17)
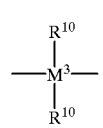

wherein each $R^{10}$ is independently a hydrogen atom, or a hydrocarbon group of 1 to 20 carbons; $M^3$ is an atom of silicon, germanium, or tin, $R^7$ forming a bridge between $R^5$ and $R^6$, and p is an integer from 1 to 5.

8. The olefin polymerization catalyst according to claim 1 or 2, wherein the component (A) is a metallocene compound represented by General Formula (18), (19), (20), or (21):

(18)
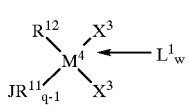

(19)
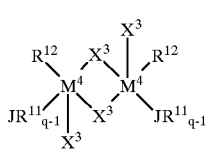

-continued

(20)
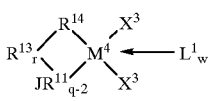

(21)
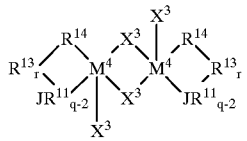

where $M^4$ is an atom of titanium, zirconium, or hafnium; each $X^3$ is independently a hydrogen atom, a halogen atom, or a hydrocarbon group of 1 to 20 carbons; $L^1$ is a Lewis base, w is a number in the range of $0 \leq w \leq 3$; $JR^{11}_{q-1}$ and $JR^{11}_{q-2}$ are independently a heteroatom ligand of $M^4$; J is an element of Group 15 of the Periodic Table of coordination number 3 or an element of Group 16 of the Periodic Table of coordination number 2; each $R^{11}$ is independently a hydrogen atom, a halogen atom, or a hydrocarbon group of 1 to 20 carbons; q is a coordination number of the element J; $R^{12}$ is a ligand of $M^4$ and represented by General Formula (22), (23), (24), or (25):

(22)
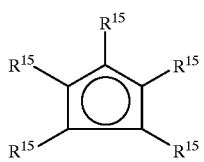

(23)
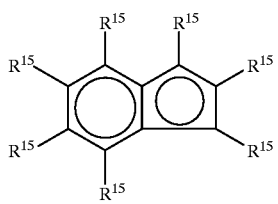

(24)
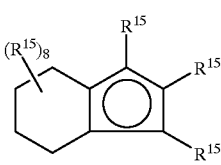

(25)
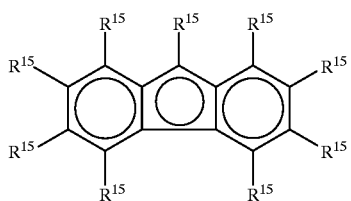

wherein each $R^{15}$ is independently a hydrogen atom, a halogen atom, a hydrocarbon group of 1 to 20 carbons, an amino group-containing hydrocarbon group of 1 to 20 carbons, or an oxygen-containing hydrocarbon group of 1 to 20 carbons, each $R^{14}$ is independently a ligand of $M^4$ and represented by General Formula (26), (27), (28) or (29):

(26)

(27)

(28)

(29)

wherein each $R^{16}$ is independently a hydrogen atom, a halogen atom, a hydrocarbon group of 1 to 20 carbons, an amino group-containing hydrocarbon group of 1 to 20 carbons, or an oxygen-containing hydrocarbon group of 1 to 20 carbons; $R^{13}$ is represented by General Formula (30) or (31):

(30)

(31)

wherein each $R^{17}$ is independently a hydrogen atom, or a hydrocarbon group of 1 to 20 carbons; $M^5$ is an atom of silicon, germanium, or tin, $R^{13}$ forming a bridge between $R^{14}$ and $JR^{11}_{q-2}$; and r is an integer of 1 to 5.

* * * * *